(12) United States Patent
Saito et al.

(10) Patent No.: US 6,732,423 B2
(45) Date of Patent: May 11, 2004

(54) ASSEMBLY DEVICE FOR STACKED RING

(75) Inventors: Koji Saito, Sayama (JP); Yoshihiko Suzuki, Sayama (JP); Katsumune Inaki, Sayama (JP); Tetsuo Sugizono, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/380,219
(22) PCT Filed: Aug. 15, 2001
(86) PCT No.: PCT/JP01/07029
§ 371 (c)(1), (2), (4) Date: Mar. 12, 2003
(87) PCT Pub. No.: WO02/24399
PCT Pub. Date: Mar. 28, 2002

(65) Prior Publication Data
US 2003/0183323 A1 Oct. 2, 2003

(30) Foreign Application Priority Data
Sep. 12, 2000 (JP) ........................................ 2000-276328
Jun. 1, 2001 (JP) ........................................ 2001-166916

(51) Int. Cl.$^7$ ................................................. B23P 21/00
(52) U.S. Cl. ........................... 29/709; 29/738; 29/701; 29/428; 29/609; 29/596; 29/703; 29/33 L
(58) Field of Search ........................ 29/709, 701, 738, 29/703, 714, 33 L, 526.2, 428, 609, 596

(56) References Cited

U.S. PATENT DOCUMENTS

| | | | | |
|---|---|---|---|---|
| 5,550,327 A | * | 8/1996 | Neuenschwander | 177/25.14 |
| 5,755,023 A | * | 5/1998 | Neuenschwander | 29/596 |
| 6,131,268 A | * | 10/2000 | Neuenschwander | 29/596 |
| 6,615,482 B2 | * | 9/2003 | Rand | 29/602.1 |

FOREIGN PATENT DOCUMENTS

| | | |
|---|---|---|
| JP | 56-52139 A | 5/1981 |
| JP | 61-203232 A | 9/1986 |
| JP | 61-203233 A | 9/1986 |
| JP | 1-321132 A | 12/1989 |
| JP | 7-185960 A | 7/1995 |
| JP | 9-314431 A | 12/1997 |

* cited by examiner

Primary Examiner—David P. Bryant
Assistant Examiner—Stephen Kenny
(74) Attorney, Agent, or Firm—Birch, Stewart, Kolasch & Birch, LLP

(57) ABSTRACT

When ring components 4 of layers to assemble a laminated ring 3 are unloaded from a component storage facility 10, a computer 13 generates lamination combinatorial data representing a combination of ring components of layers. A target frequency distribution of circumferential length values of ring components 4 of each layer is established, and lamination combinatorial data including ring components of a class where an error of an actual inventory frequency with respect to a target frequency is large are selected in a layer where an error between the target frequency distribution and an actual inventory frequency distribution is maximum. Ring components 4 of all layers corresponding to the selected lamination combinatorial data are unloaded from the component storage facility 10. A distribution of size data of the ring components 4 of each layer in the component storage facility 10 is thus continuously maintained in a state capable of assembling more laminated rings 4, and the stable mass-productivity of laminated rings 3 is continuously achieved.

15 Claims, 16 Drawing Sheets

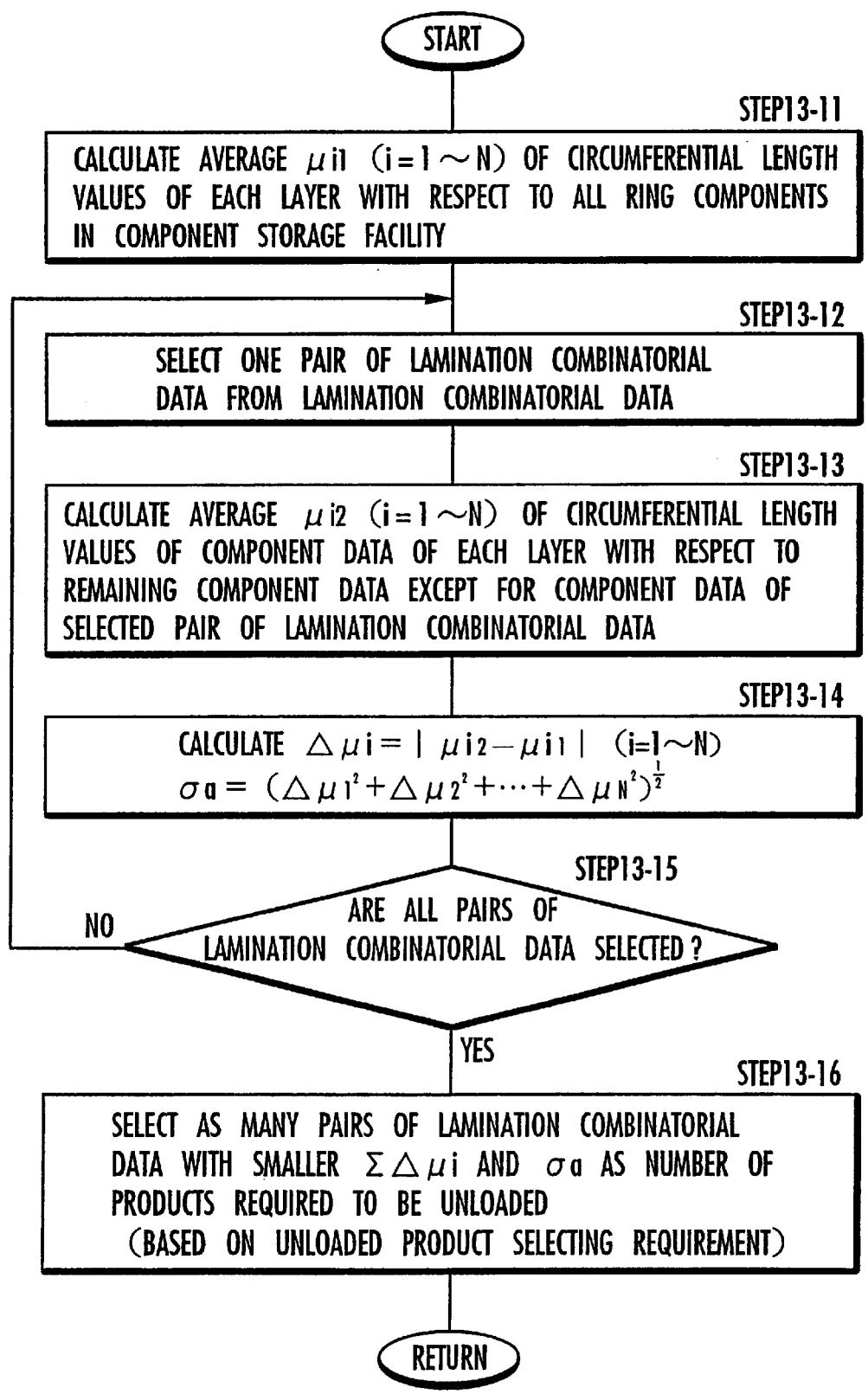

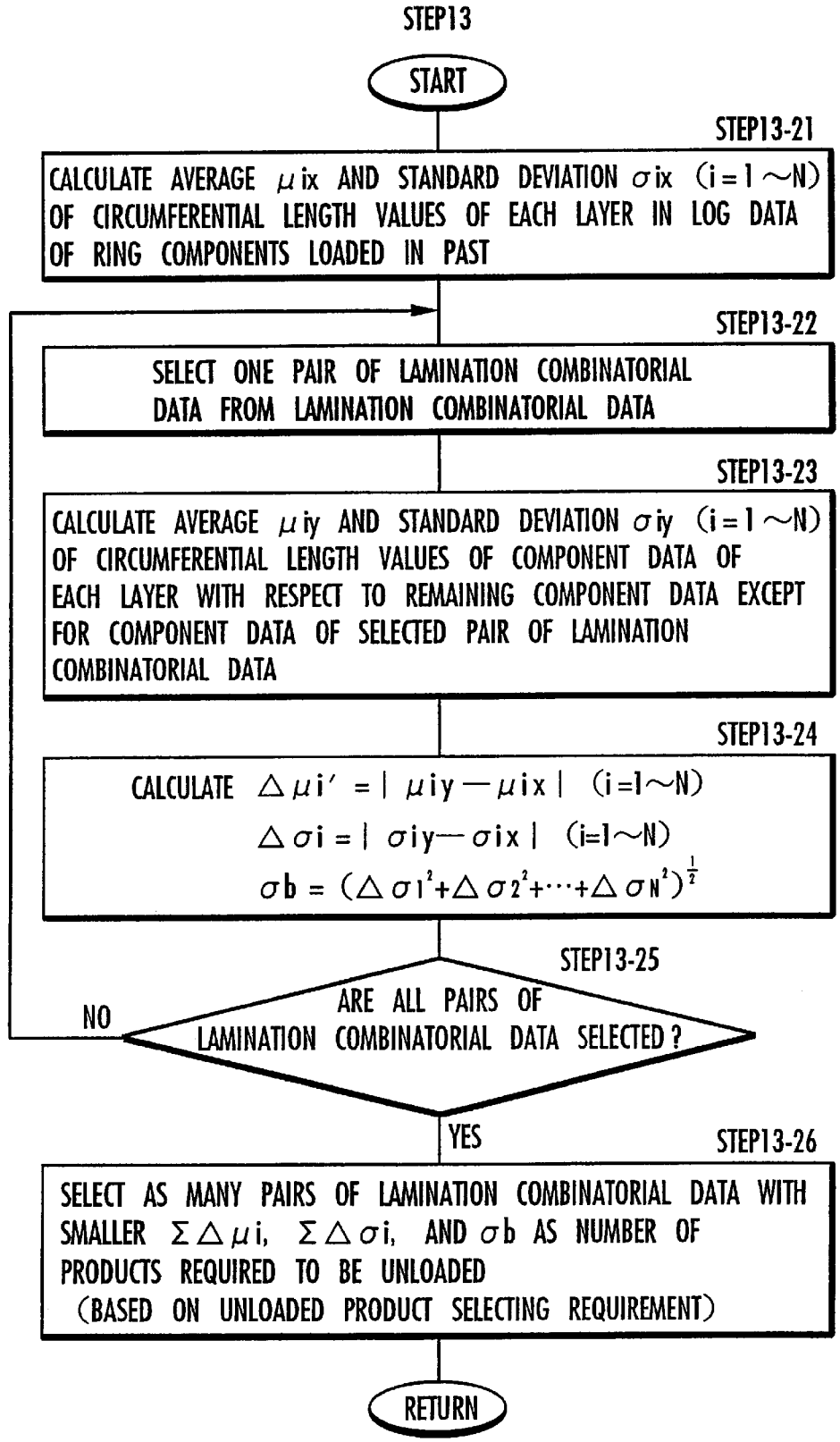

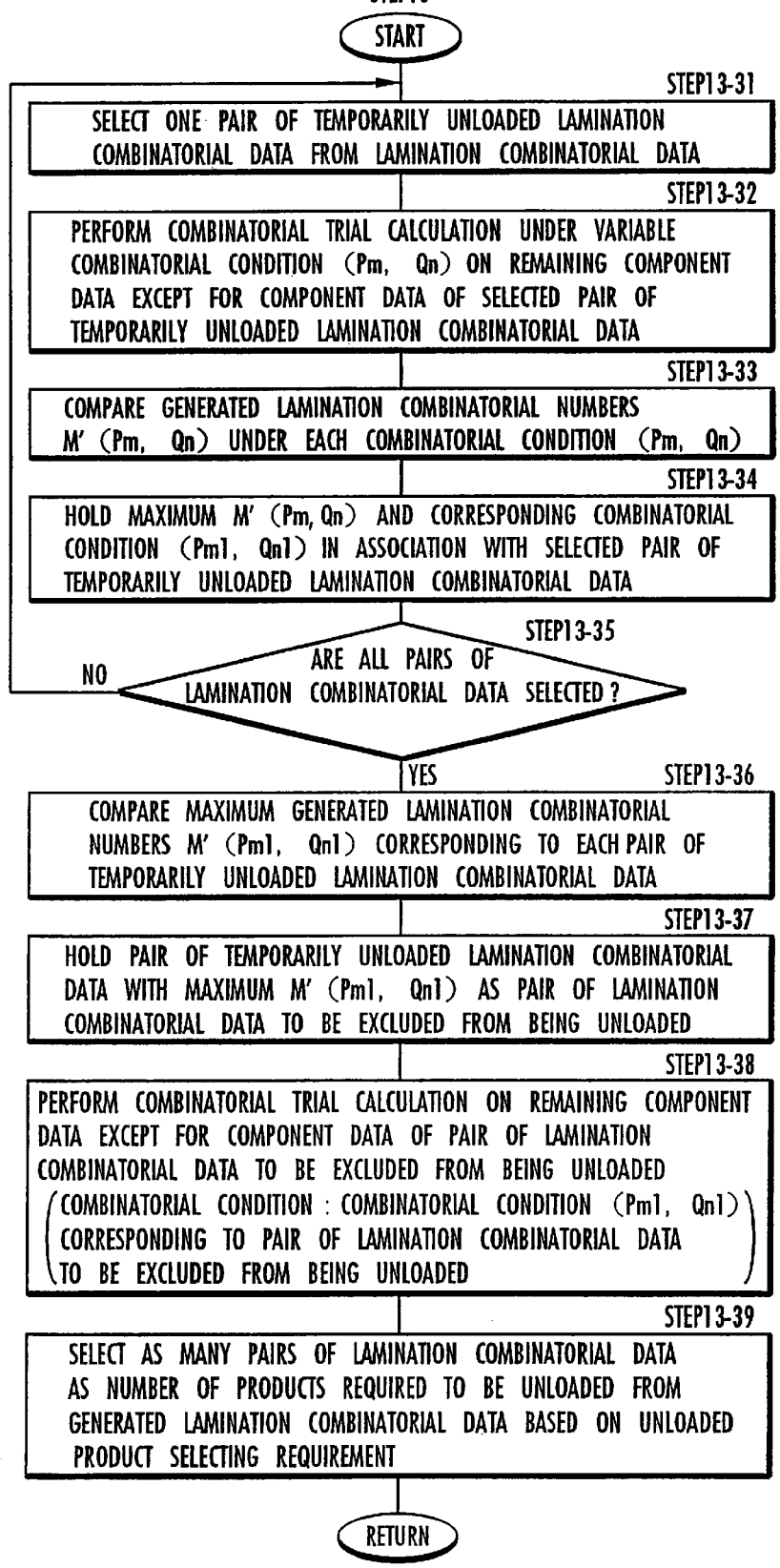

ASSEMBLY DEVICE FOR STACKED RING

This application is the national phase under 35 U.S.C. § 371 of PCT International Application No. PCT/JP01/07029 which has an International filing date of Aug. 15, 2001, which designated the United States of America.

TECHNICAL FIELD

The present invention relates to an apparatus for assembling a laminated ring comprising a plurality of endless ring components, such as a belt for use in a continuously variable transmission (CVT) or the like.

BACKGROUND ART

Belts for use in continuously variable transmissions (CVTs) such as automobile transmissions, for example, comprise a pair of laminated rings each made up of a plurality of endless ring components of metal that are assembled in a laminated form in their transverse direction. Such a laminated ring is manufactured as follows:

Ring components that serve as respective layers of a laminated ring are produced and stored by a component storage facility. The ring component serving as each layer is basically manufactured such that its circumferential length and radius are of design values (which differ from layer to layer). Generally, however, the actual circumferential lengths and radii of the manufactured ring components suffer errors introduced in the manufacturing process. Therefore, the circumferential lengths and radii of the ring components are not always in exact agreement with design values, but tend to vary from design values to a certain extent. Size data representing the circumferential lengths, radii, etc. of the manufactured ring components are separately measured, and the measured data are stored by association with the individual ring components.

Then, ring components to be used for assembling a laminated ring are selected from the manufactured and stored ring components for use as respective layers, and combined into a laminated ring. Such an assembling process is repeated as many times as the number of required laminated rings. A laminated ring for use as a belt in a CVT or the like is required to meet predetermined standard requirements such that the difference between the circumferential lengths of adjacent ring components thereof fall in a certain allowable range. Since the sizes of the ring components as respective layers suffer variations, when ring components of respective layers in a component storage facility are arbitrarily or randomly selected and combined, they may not necessarily make a desired laminated ring.

Heretofore, it has been customary for the worker to select and combine ring components from a plurality of ring components of respective layers to match given standard requirements by seeing a log of measured values of size data.

Therefore, the conventional process of selecting and combining ring components of respective layers has been tedious and time-consuming, and has presented an obstacle to efforts to increase the mass-productivity of laminated rings. Size data of ring components that are selected for being combined tend to deviate from each other. As a result, the size data of the ring components in the component storage facility have a distribution which makes it difficult to produce a preferred combination of ring components, and some ring components remain uncombined over a long period of time.

The applicant of the present application has attempted to perform, on a computer, combinatorial trial calculations for combining ring components of layers under an adequate combinatorial condition based on the size data, etc. of the ring components of the layers that are stored in the component storage facility. Ring components in as many combinations as required are unloaded from the component storage facility among combinations of ring components of layers that are produced by the above combinatorial trial calculations, and then are laminated into laminated rings.

Combinatorial conditions are set to be able to assemble as many laminated rings as possible for increasing the mass-productivity of laminated rings. For selecting a combination to be unloaded among combinations of ring components of layers obtained by combinatorial trial calculations, a combination that better matches standard requirements for size is selected.

Using a computer to perform combinatorial trial calculations makes it possible to select and combine ring components of layers efficiently in a short period of time.

If, however, a combination to be unloaded is inappropriately selected among combinations of ring components of layers obtained by combinatorial trial calculations (e.g., when a combination that better matches standard requirements for size is selected), size data of ring components of layers in the component storage facility may deviate from each other and distributions of size data of layers may vary from each other. If such a side data deviation or a size data distribution variation occurs, then the total number of combinations of ring components that can be obtained by combinatorial trial calculations is likely to be reduced, and those ring components which cannot be combined continuously remain unused in the component storage facility. As a result, it becomes difficult to mass-produce laminated rings continuously and stably.

It is therefore an object of the present invention to provide an apparatus for assembling more laminated rings continuously from ring components of layers stored in a component storage facility, thus continuously maintaining stable mass-productivity of laminated rings.

DISCLOSURE OF THE INVENTION

To achieve the above object, an apparatus for assembling a laminated ring according to the present invention is provided in first through third aspects. According to the first aspect, an apparatus for assembling a laminated ring, comprises a component storage facility for storing a plurality of endless ring components of each of layers which are to be laminated into a laminated ring, component data managing means for storing component data including size data representative of at least respective circumferential length values of the ring components stored in the component storage facility, combinatorial trial calculation means for performing combinatorial trial calculations to combine the component data of the layers, one by one for all the layers, in the component storage facility under a predetermined combinatorial condition based on the component data of the ring components stored by the component data managing means, to generate a plurality of lamination combinatorial data representing combinations of the ring components of the respectively layers which can be assembled into the laminated ring, and unloaded product selecting means for selecting lamination combinatorial data corresponding to a laminated ring to be actually assembled from the lamination combinatorial data generated by the combinatorial trial calculation means, wherein ring components of each of the layers corresponding to the lamination combinatorial data selected by the unloaded product selecting means can be unloaded from the component storage facility to assemble a laminated ring, the unloaded product selecting means comprising means for setting a target frequency distribution in a predetermined standard range of size data of ring components of each of the layers such that the target frequency distribution is of a substantially identical shape between the layers and target frequencies in all classes established in the standard range are equal to or greater than a predetermined positive minimum value, means for determining an actual frequency distribution of size data of ring components of each of the layers in the component storage facility as an actual inventory frequency distribution based on the size data held by the component data managing means, means for comparing the target frequency distribution and the actual inventory frequency distribution with each other for each of the layers and extracting a layer where an error of the actual inventory frequency distribution with respect to the target frequency distribution is maximum as a particular layer, means for correcting a deviation, from a target frequency in the target frequency distribution, of a frequency in each of classes in the actual inventory frequency distribution of the particular layer, which frequency is greater than the target frequency in the target frequency distribution, with a predetermined weighting coefficient for each of the classes, means for selecting a class in which the corrected deviation is of a maximum value as a class with unloading priority, and means for selecting lamination combinatorial data including component data belonging to the class with unloading priority of the particular layer, out of the lamination combinatorial data generated by the combinatorial trial calculation means, as lamination combinatorial data corresponding to a laminated ring to be actually assembled, wherein the weighting coefficient is established such that the value of the deviation which is corrected by the weighting coefficient is greater for a class whose frequency tends to increase as a new ring component is loaded into the component storage facility.

In the first aspect of the present invention, the layer where an error of the actual inventory frequency distribution with respect to the target frequency distribution is maximum is extracted as the particular layer, and the class having a frequency greater than the target frequency in the target frequency distribution is selected as the class with unloading priority from the classes in the actual inventory frequency distribution of the particular layer. Of the lamination combinatorial data generated by the combinatorial trial calculation means, the lamination combinatorial data including the component data belonging to the class with unloading priority of the particular layer are selected as the lamination combinatorial data corresponding to the laminated ring to be actually assembled. Ring components of the layers belonging to the selected lamination combinatorial data are unloaded from the component storage facility and assembled into the laminated ring. Therefore, the ring components belonging to the class with unloading priority of the particular layer are preferentially unloaded, and the frequency of the class with unloading priority is reduced and approaches the target frequency. As the above unloading process is repeated, the actual inventory frequency distribution of each layer approaches the target frequency distribution until finally the actual inventory frequency distribution is substantially kept equal to the target frequency distribution.

If there is only one class whose frequency is greater than the target frequency in the target frequency distribution, then that class is selected as the class with unloading priority. However, if there are a plurality of classes whose frequency is greater than the target frequency, then the class where a value produced by correcting the deviation between the frequency of each class and the target frequency with the weighting coefficient is maximum is selected as the class with unloading priority. The weighting coefficient is established such that the value of the deviation which is corrected by the weighting coefficient is greater for a class whose frequency tends to increase as a new ring component is loaded into the component storage facility, or stated otherwise, for a class where the size data of ring components loaded into the component storage facility appear more frequently. Therefore, a class whose frequency tends to increase is selected as the class with unloading priority. Consequently, the actual inventory frequency distribution of each layer can be brought closely to the target frequency distribution.

In the first aspect of the present invention, the target frequency distribution is set such that the target frequency distribution is of a substantially identical shape between the layers and target frequencies in all classes established in the standard range are equal to or greater than the predetermined positive minimum value. Therefore, the actual inventory frequency distribution which approaches the target frequency distribution as described above is of a substantially identical shape between the layers, and becomes such a distribution that in all classes of each layer, ring components whose frequencies are equal to or higher than the minimum value are present in the component storage facility at all times. As a result, the actual inventory frequency distribution of size data of the ring components of each layer in the component storage facility is continuously maintained as a distribution capable of assembling more laminated rings from the ring components.

According to the first aspect of the present invention, therefore, the frequency distribution of the size data of the ring components of each layer in the component storage facility can continuously be maintained in a state capable of generating more laminated rings, and hence laminated rings can be mass-produced continuously stably.

In the first aspect of the present invention, the unloaded product selecting means preferably comprises means for determining, for each layer, a variation of the size data of the ring components of each layer which have been loaded into the component storage facility in the past, and means for determining a normal frequency distribution, as a basic frequency distribution for each layer, which has a variation substantially identical to an average value of the determined variations of the layers and also has, at its center, a central value of predetermined size data of the layer, wherein the target frequency distribution for each layer is established with respect to the basic frequency distribution by correcting the frequency of a class which is lower than the minimum value into the minimum value.

Generally, the size data of ring components of each layer which are manufactured have a normal frequency distribution having a certain central value (usually a design value). A variation of the size data (e.g., a standard deviation) represents the spreading extent of the normal frequency distribution.

For bringing the actual inventory frequency distribution of each layer efficiently and quickly closely to the target frequency distribution, it is preferable to set a target frequency distribution based on the actual distribution of size data of the ring components of each layer which are loaded into the component storage facility.

In the first aspect of the present invention, therefore, a variation of the size data of the ring components of each layer which have been loaded into the component storage facility in the past is determined for each layer, and a normal frequency distribution is determined as a basic frequency distribution for each layer (a frequency distribution as a basis for the target frequency distribution) which has a variation substantially identical to an average value of the determined variations of the layers and also has, at its center, a central value of predetermined size data of the layer. With the basic frequency distribution, the frequency may be lower than the minimum value, which is determined as a frequency to be kept as a minimum in each class, in classes near the opposite ends of the standard range for setting the target frequency distribution. For those classes where the frequency is lower than the minimum value, the frequency is corrected into the minimum value, and the corrected basic frequency distribution is set as the target frequency distribution.

With the target frequency distribution thus set, it is possible to bring the actual inventory frequency distribution of each layer efficiently and quickly closely to a distribution capable of continuously maintaining the stable mass productivity of laminated rings.

In the first aspect of the present invention, if there are a plurality of lamination combinatorial data including component data belonging to the class with unloading priority of the particular layer, the unloaded product selecting means preferably calculates the total number of layers, as a target shortage layer number, where the distribution of the actual inventory frequency distribution is equal to or smaller than the target frequency, based on the distribution of the actual inventory frequency distribution and the target frequency of the target frequency distribution in the classes of the size data of the layers other than the particular layer, and preferentially selects lamination combinatorial data where the target shortage layer number is smaller.

Furthermore, if there are a plurality of lamination combinatorial data where the target shortage layer number is minimum, the unloaded product selecting means preferably calculates a deviation between the distribution of the actual inventory frequency distribution and the target distribution in a layer where the distribution of the actual inventory frequency distribution is equal to or smaller than the target distribution, based on the distribution of the actual inventory frequency distribution and the target frequency of the target frequency distribution in the classes of the size data of the layers other than the particular layer, calculates the sum of the deviations of all the layers other than the particular layer as a target shortage sum, and preferentially selects lamination combinatorial data where the absolute value of the target shortage sum is smaller.

With the above arrangement, if there are a plurality of lamination combinatorial data including component data belonging to the class with unloading priority of the particular layer, then of the lamination combinatorial data, those lamination combinatorial data where the target shortage layer number is greater, i.e., those lamination combinatorial data which have more layers where the frequency in the actual inventory frequency distribution is equal to or smaller than the target frequency, are not positively selected, but lamination combinatorial data other than those lamination combinatorial data (lamination combinatorial data where the target shortage layer number is smaller) are preferentially selected as lamination combinatorial data corresponding to a laminated ring to be actually assembled. If there are a plurality of lamination combinatorial data where the target shortage layer number is minimum, then those lamination combinatorial data where the absolute value of the target shortage sum is greater, i.e., those lamination combinatorial data which have layers where the degree by which the frequency in the actual inventory frequency distribution is smaller than the target frequency is relatively high, are not positively selected, but lamination combinatorial data other than those lamination combinatorial data (lamination combinatorial data where the target shortage sum is smaller) are preferentially selected as lamination combinatorial data corresponding to a laminated ring to be actually assembled.

With the above arrangement, the actual inventory frequency distribution is prevented from becoming a distribution having a valley (recess) with respect to the target frequency distribution. Specifically, if the actual inventory frequency distribution had a valley, then the total number of lamination combinatorial data (the number of laminated rings that can be assembled) obtained with respect to the ring components in the component storage facility would have a general tendency to drop quickly. Such a tendency is prevented according to the above arrangement.

If the laminated ring is used as a pair of laminated rings with the component data of ring components of at least one layer satisfying a predetermined requirement, and if there are a plurality of lamination combinatorial data including component data belonging to the class with unloading priority of the particular layer, the unloaded product selecting means preferentially selects a pair of lamination combinatorial data which satisfy the predetermined requirement and both include component data belonging to the class with unloading priority of the particular layer, out of the plurality of lamination combinatorial data.

Specifically, if two laminated rings are used in a pair (e.g., as laminated rings for use in a belt for a continuously variable transmission (CVT)), then the two laminated rings are generally required to satisfy a certain requirement (e.g., a requirement that the difference between the circumferential length values of ring components of innermost or outermost layers of the laminated ring fall within a certain range). In this case, a pair of lamination combinatorial data which satisfy the predetermined requirement and both include component data belonging to the class with unloading priority of the particular layer is selected out of the plurality of lamination combinatorial data including the component data belonging to the class with unloading priority of the particular layer.

Thus, a pair of lamination combinatorial data include component data belonging to the class with unloading priority of the particular layer is selected, and ring components of the layers corresponding to the selected lamination combinatorial data are unloaded from the component storage facility and assembled into a pair of laminated rings. Therefore, a desired pair of laminated rings can be assembled, and the actual inventory frequency distribution can be brought quickly closely to the target frequency distribution.

In the first aspect of the present invention, the combinatorial trial calculation means preferably comprises means for variably setting a plurality of kinds of combinatorial conditions and performing the combinatorial trial calculations under the set plurality of kinds of combinatorial conditions, and means for evaluating the number of the lamination combinatorial data obtained by the combinatorial trial calculations under the kinds of combinatorial conditions and determining a combinatorial condition which maximizes the number as an adequate combinatorial condition.

With the above arrangement, there is found a combinatorial condition for maximizing the number of lamination combinatorial data generated by combinatorial trial calculations, and such a combinatorial condition is determined as the predetermined combinatorial condition. Lamination combinatorial data corresponding to a laminated ring to be assembled are selected by the unloaded product selecting means from the lamination combinatorial data generated by combinatorial trial calculations based on the combinatorial condition. Therefore, even when the number of laminated rings required to be assembled is relatively large with respect to the ring components presently stored in the component storage facility, it is possible to supply ring components for assembling the required number of laminated rings from the component storage facility. As a consequence, the mass productivity of laminated rings is increased, and laminated rings can continuously and stably be mass-produced.

According to a second aspect of the present invention, an apparatus for assembling a laminated ring comprises a component storage facility for storing a plurality of endless ring components of each of layers which are to be laminated into a laminated ring, component data managing means for storing component data including size data representative of at least respective circumferential length values of the ring components stored in the component storage facility, combinatorial trial calculation means for performing combinatorial trial calculations to combine the component data of the layers, one by one for all the layers, in the component storage facility under a predetermined combinatorial condition based on the component data of the ring components stored by the component data managing means, to generate a plurality of lamination combinatorial data representing combinations of the ring components of the respectively layers which can be assembled into the laminated ring, and unloaded product selecting means for selecting lamination combinatorial data corresponding to a laminated ring to be actually assembled from the lamination combinatorial data generated by the combinatorial trial calculation means, wherein ring components of each of the layers corresponding to the lamination combinatorial data selected by the unloaded product selecting means can be unloaded from the component storage facility to assemble a laminated ring, the unloaded product selecting means comprising means for performing, for a plurality of times, a process of selecting a predetermined number of lamination combinatorial data as hypothetical unloading combinatorial data from the lamination combinatorial data generated by the combinatorial trial calculation means, and means for, each time the predetermined number of hypothetical unloading combinatorial data are selected, determining the degree of agreement between a frequency distribution of the size data in each layer of remaining component data which are obtained by removing the component data of each layer included in the selected hypothetical unloading combinatorial data from the component data held by the component data managing means and a predetermined target frequency distribution for each layer, wherein the predetermined number of hypothetical unloading combinatorial data where the degree of agreement is higher are preferentially selected as lamination combinatorial data corresponding to a laminated ring to be actually assembled.

In the second aspect of the present invention, the unloaded product selecting means selects a predetermined number of lamination combinatorial data (the hypothetically unloaded combinatorial data) from the lamination combinatorial data generated by the combinatorial trial calculations performed by the combinatorial trial calculation means, and unloads a combination of ring components of the layers corresponding to the selected hypothetically unloaded combinatorial data from the component storage facility. Such a hypothetically unloading process is carried out a plurality of times. The hypothetically unloaded combinatorial data selected in the respective hypothetically unloading processes are different from each other. If the predetermined number of hypothetically unloaded combinatorial data is 2 or more, then one or a plurality of (<the predetermined number) hypothetically unloaded combinatorial data in one process may be identical to one or a plurality of hypothetically unloaded combinatorial data in another process. The predetermined number may be the same as or smaller than the number of combinations of ring components of the layers (the number of laminated rings to be assembled) that are required to be actually unloaded from the component storage facility.

Each time the hypothetical unloading process is carried out (i.e., the predetermined number of hypothetical unloading combinatorial data are selected), the unloaded product selecting means determines the degree of agreement between a frequency distribution of the size data in each layer of remaining component data which are obtained by removing the component data of each layer included in the selected hypothetical unloading combinatorial data from the component data held by the component data managing means and a predetermined target frequency distribution for each layer, and preferentially selects the predetermined number of hypothetical unloading combinatorial data where the degree of agreement is higher as lamination combinatorial data corresponding to a laminated ring to be actually assembled. In the present invention, ring components of the layers corresponding to the component data included in the selected lamination combinatorial data are unloaded from the component storage facility and assembled into the laminated ring.

In the second aspect of the present invention, therefore, ring components of the layers are unloaded while the frequency distribution of the values of size data of the layers in the component storage facility is being controlled at a desired target frequency distribution. In this manner, the mass productivity of laminated rings can continuously and stably be achieved while avoiding a deviation of the values of the size data of the layers in the component storage facility.

In the second aspect of the present invention, the target frequency distribution comprises, for example, a frequency distribution of size data of a plurality of ring components for each layer which have been loaded into the component storage facility in the past.

The frequency distribution of size data of the ring components of the layers in the component storage facility is maintained at the frequency distribution of average size data of the ring components of each layer which have actually been loaded into the component storage facility in the past. Thus, the frequency distribution of size data of the ring components of the layers in the component storage facility is maintained at a frequency distribution capable of assembling more laminated rings, and the continuous and stable mass productivity of laminated rings can be increased.

Specifically, the ring components of each layer which have been loaded into the component storage facility in the past may be ring components which have been loaded into the component storage facility for a certain period of time in the past or ring components of a certain long number which have been loaded into the component storage facility in the past.

Alternatively, the target frequency distribution comprises a frequency distribution of size data of a plurality of ring components for each layer which are presently stored in the component storage facility.

With the above arrangement, ring components in the component storage facility are combined and unloaded while the frequency distribution of size data of the ring components of the layers in the component storage facility is maintained at the frequency distribution of present size data in the component storage facility. In this case, as a new ring component is loaded into the component storage facility, the frequency distribution of size data of the ring components of the layers in the component storage facility basically approaches a frequency distribution with a design value at its center. Thus, the frequency distribution of size data of the ring components in the component storage facility is kept at a frequency distribution capable of assembling more laminated rings, and the continuous and stable mass productivity of laminated rings can be increased.

In the second aspect of the present invention, the unloaded product selecting means determines the degree of agreement by comparing one or both of an average value of the size data of each layer of at least the remaining component data and a variation of the size data with one or both of an average value of size data and a variation thereof with respect to the target frequency distribution.

In order to determine the degree of agreement between the frequency distribution of the values of the size data of the remaining component data after the hypothetical unloading and the target frequency distribution, the average value of size data and the variation thereof (e.g., a standard deviation or a variance) is used for appropriate determination of the degree of agreement.

In the second aspect of the present invention, the combinatorial trial calculation means preferably comprises means for variably setting a plurality of kinds of combinatorial conditions and performing the combinatorial trial calculations under the set plurality of kinds of combinatorial conditions, and means for evaluating the number of the lamination combinatorial data obtained by the combinatorial trial calculations under the kinds of combinatorial conditions and determining a combinatorial condition which maximizes the number as an adequate combinatorial condition.

As with the first aspect of the present invention as described above, lamination combinatorial data are selected by the unloaded product selecting means from the lamination combinatorial data generated by combinatorial trial calculations based on the combinatorial condition which maximizes the number of lamination combinatorial data. Therefore, even when the number of laminated rings required to be assembled is relatively large with respect to the ring components presently stored in the component storage facility, it is possible to supply ring components for assembling the required number of laminated rings from the component storage facility. As a consequence, the mass productivity of laminated rings is increased, and laminated rings can continuously and stably be mass-produced.

According to a third aspect of the present invention, an apparatus for assembling a laminated ring comprises a component storage facility for storing a plurality of endless ring components of each of layers which are to be laminated into a laminated ring, wherein ring components to assemble the laminated ring are selected from the ring components of each layer which are stored in the component storage facility, unloaded from the component storage facility, and laminated into a laminated ring, first combinatorial trial calculation means for performing combinatorial trial calculations to combine the component data of the layers, one by one for all the layers, in the component storage facility under a predetermined first combinatorial condition based on the component data of the ring components stored by the component data managing means, to generate a plurality of lamination combinatorial data representing combinations of the ring components of the respectively layers which can be assembled into the laminated ring, second combinatorial trial calculation means for performing, for a plurality of times, a process of selecting a predetermined number of lamination combinatorial data as hypothetical unloading combinatorial data from the lamination combinatorial data generated by the first combinatorial trial calculation means, and, each time the predetermined number of hypothetical unloading combinatorial data are selected, performing combinatorial trial calculations on remaining component data which are obtained by removing the component data of the ring components of each layer corresponding to the selected predetermined number of lamination combinatorial data, under a second combinatorial condition based on the remaining component data to generate lamination combinatorial data matching the second combinatorial condition, unloaded product selecting means for evaluating the number of lamination combinatorial data generated by the second combinatorial trial calculation means per selection of the hypothetical unloading combinatorial data, and selecting lamination combinatorial data corresponding to a laminated ring to be actually assembled from the unloading combinatorial data whose number is maximum, wherein ring components corresponding to the lamination combinatorial data selected by the unloaded product selecting means are unloaded from the component storage facility and assembled into a laminated ring.

In the third aspect of the present invention, as with the unloaded product selecting means in the second aspect, the second combinatorial trial calculation means selects a predetermined number of lamination combinatorial data (the hypothetically unloaded combinatorial data) from the lamination combinatorial data generated by the combinatorial trial calculations performed under the first combinatorial condition by the first combinatorial trial calculation means, and unloads a combination of ring components of the layers corresponding to the selected hypothetically unloaded combinatorial data from the component storage facility. Such a hypothetically unloading process is carried out a plurality of times.

Per hypothetical unloading process (each time a predetermined number of hypothetically unloaded combinatorial data are selected), the second combinatorial trial calculation means performs combinatorial trial calculations under the second combinatorial condition on the remaining component data (corresponding to ring components left in the component storage facility) obtained by removing the selected hypothetically unloaded combinatorial data from the component data held by the component data managing means. In this manner, a hypothetical combination (lamination combinatorial data) of ring components of the layers for assembling a laminated ring from the ring components left in the component storage facility after the hypothetical unloading process is obtained in each present hypothetical unloading process (per selection of a predetermined number of hypothetically unloaded combinatorial data).

In the third aspect of the present invention, the unloaded product selecting means evaluates the number of lamination combinatorial data generated by combinatorial trial calculations performed by the second combinatorial trial calculation means after the hypothetical unloading process, and selects lamination combinatorial data corresponding to a laminated ring to be actually assembled from the unloading combinatorial data whose number is maximum. That is, when combinatorial trial calculations after the hypothetical unloading process are performed on the remaining component data, lamination combinatorial data corresponding to a laminated ring to be actually assembled are selected from the lamination combinatorial data generated from the remaining component data except the component data included in the predetermined number of hypothetically unloaded combinatorial data capable of generating most lamination combinatorial data. Ring components corresponding to the component data included in the selected lamination combinatorial data are then unloaded from the component storage facility and assembled into the laminated ring.

In the third aspect of the present invention, therefore, a combination of ring components of the layers to assemble a laminated ring are unloaded from the component storage facility while leaving ring components of the layers able to assemble more laminated rings in the component storage facility. In this manner, the mass productivity of laminated rings can stably and continuously be achieved.

In the third aspect of the present invention, the first combinatorial trial calculation means preferably comprises means for variably setting a plurality of kinds of combinatorial conditions and performing combinatorial trial calculations on the component data held by the component data managing means based on the set kinds of combinatorial conditions, and means for evaluating the number of the lamination combinatorial data obtained by the combinatorial trial calculations under the kinds of combinatorial conditions and determining a combinatorial condition which maximizes the number as the first combinatorial condition.

Similarly, the second combinatorial trial calculation means preferably comprises means for variably setting a plurality of kinds of combinatorial conditions and performing combinatorial trial calculations on remaining component data obtained by removing the hypothetically unloaded combinatorial data from the component data held by the component data managing means based on the set kinds of combinatorial conditions per section of the hypothetically unloaded combinatorial data, and means for evaluating the number of the lamination combinatorial data obtained by the combinatorial trial calculations under the kinds of combinatorial conditions and determining a combinatorial condition which maximizes the number as the second combinatorial condition.

Since the first combinatorial trial calculation means and the second combinatorial trial calculation means perform combinatorial trial calculations under the first combinatorial condition and the second combinatorial condition, respectively, for maximizing the number of generated lamination combinatorial data, it is possible to generate more lamination combinatorial data based on the combinatorial trial calculations carried out by the first and second combinatorial trial calculation means. Consequently, even when the number of laminated rings required to be assembled is relatively large with respect to the ring components presently stored in the component storage facility, it is possible to supply ring components to assemble the required number of laminated rings from the component storage facility. As a result, the mass productivity of laminated rings is increased, and laminated rings can continuously and stably be mass-produced.

In the third aspect of the present invention, the second combinatorial condition relative to the second combinatorial trial calculation means may be identical to the first combinatorial condition relative to the first combinatorial trial calculation means.

In the first through third aspects of the present invention, each of the combinatorial trial calculation means specifically comprises means for performing the combinatorial trial calculations by performing a particular layer data selecting process of successively selecting a plurality of component data of a predetermined particular layer (e.g., an innermost layer or an outermost layer), one by one, based on predetermined combinatorial conditions, an interlayer selecting process of selecting, sequentially from a layer adjacent to the particular layer, component data of other layers to be combined with the selected component data of the particular layer based on the combinatorial conditions each time the component data of the particular layer are selected, and a process of excluding the component data of the layers of the lamination combinatorial data from component data that can be selected in following cycles of the interlayer selecting process when the lamination combinatorial data are generated by the interlayer selecting process. The predetermined combinatorial conditions preferably include a trial calculation starting point selecting condition that prescribes a sequence in which to select component data of the particular layer in the particular layer data selecting process based on the size data, for example, and an interlayer selecting condition that prescribes which component data of a layer adjacent to a layer whose component data have been selected by the interlayer selecting process is to be selected based on the size data, for example. The predetermined combinatorial conditions serve as the first combinatorial condition with respect to the first combinatorial trial calculation means in the third aspect of the present invention, and as the second combinatorial condition with respect to the second combinatorial trial calculation means in the third aspect of the present invention.

If a plurality of kinds of predetermined combinatorial conditions are variably established, it is preferable to variably establish a plurality of kinds of one or both of the trial calculation starting point selecting condition and the interlayer selecting condition.

BRIEF DESCRIPTION OF THE DRAWINGS

FIG. 14 is a flowchart of an operation sequence according to a second embodiment of the present invention;

FIG. 15 is a flowchart of an operation sequence according to a third embodiment of the present invention; and FIG. 16 is a flowchart of an operation sequence according to a fourth embodiment of the present invention.

BEST MODE FOR CARRYING OUT THE INVENTION

Figure 1:
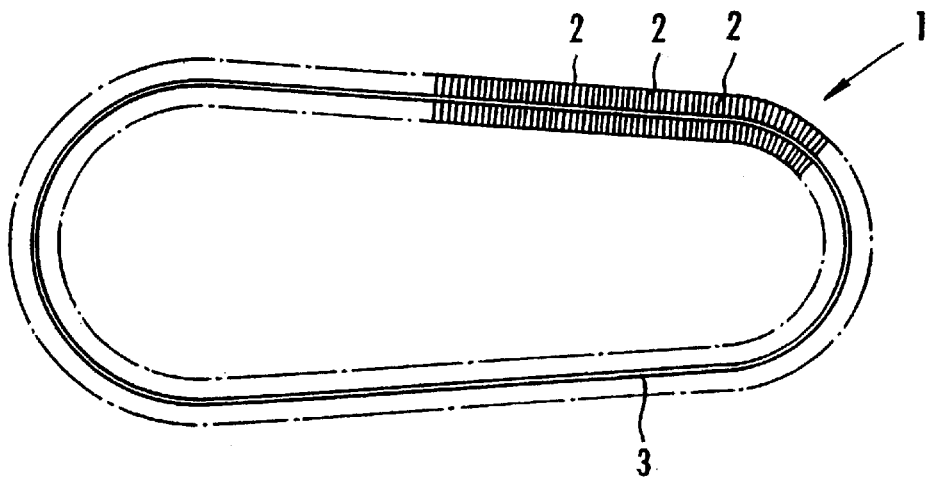
FIGS. 1(*a*) and 1(*b*) are views showing a belt for use in a continuously variable transmission, which includes a laminated ring assembled by an apparatus according to the present invention.
Figure 1:
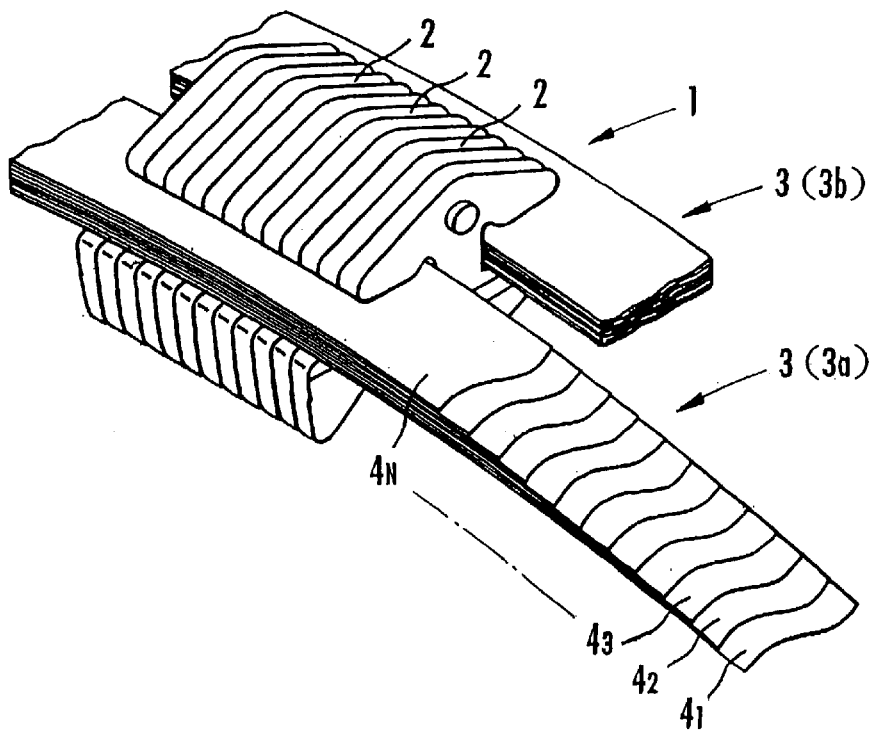

A first embodiment of the present invention will be described below with reference to FIGS. 1 through 13.

The structure of a belt for use in a CVT will first be described briefly below with reference to FIGS. 1(a) and 1(b).

FIG. 1(a) is a side elevational view of a belt for use in a CVT, and FIG. 1(b) is a fragmentary perspective view of the belt. As shown in FIGS. 1(a) and 1(b), the belt, generally denoted at 1, comprises a plurality of plate-like elements 2 engaging a pair of laminated rings 3 and arrayed in an annular form along the laminated rings 3. As shown in FIG. 1(b), each of the laminated rings 3 comprises a plurality of (N) thin endless metal ring components $4_1, 4_2, 4_3, \ldots, 4_N$ laminated in their transverse direction.

The ring components $4_1, 4_2, 4_3, \ldots 4_N$ will hereinafter be referred to collectively as ring components 4 unless they need to be distinguished from each other, and layers of each of the laminated rings 3 will hereinafter be referred to as a first layer, a second layer, ..., an N layer successively from the radially innermost layer. The set of the ring components $4_1–4_N$ of the first through Nth layers of each of the laminated rings 3 will hereinafter be referred to as set ring components (4). If the laminated rings 3 of the belt 1 need to be distinguished from each other, then one of the laminated rings 3 will be referred to as a first laminated ring 3a and the other as a second laminated ring 3b (see FIG. 1(b)).

Figure 2:
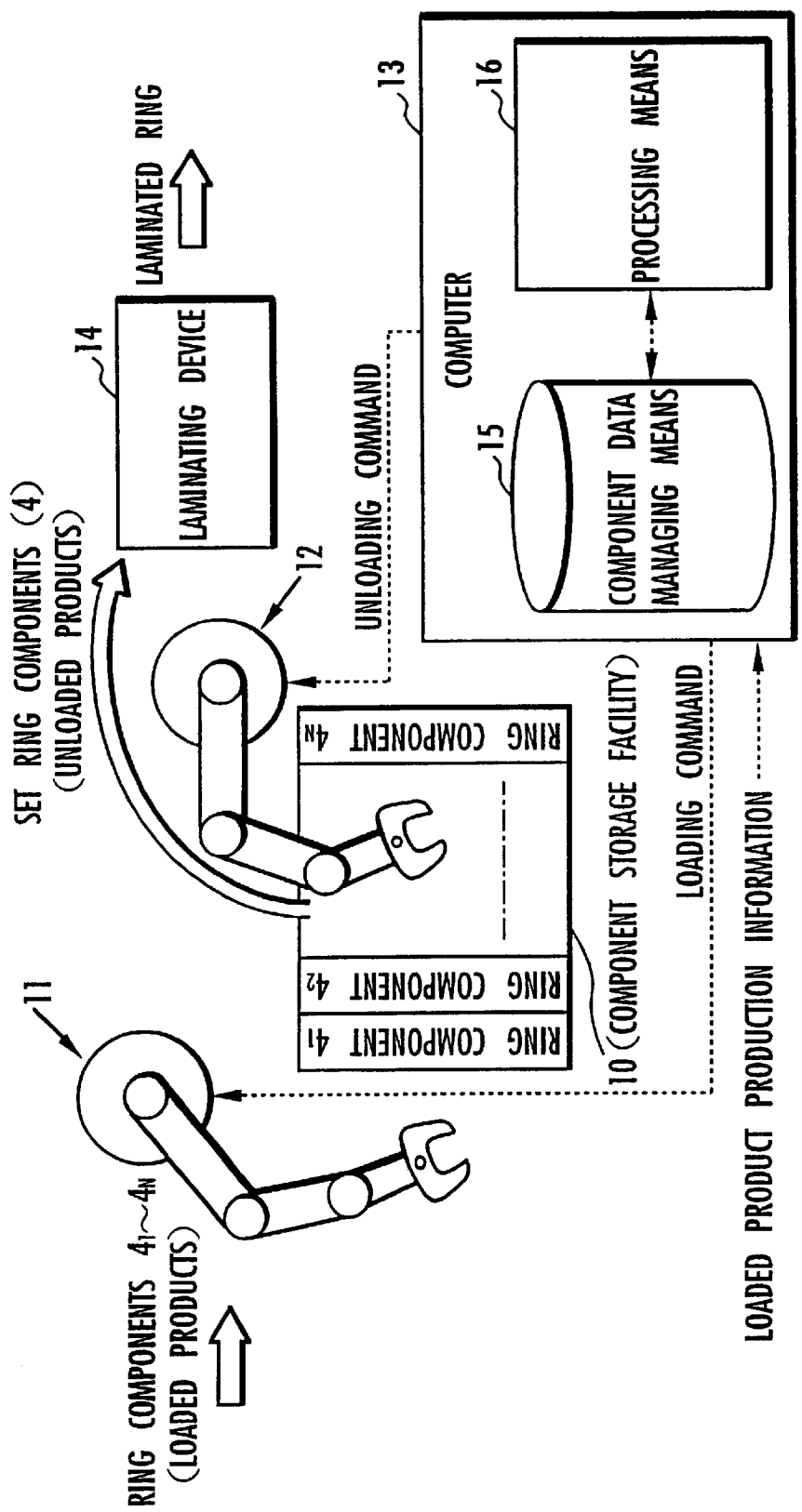
FIG. 2 is a schematic view, partly in block form, of a system arrangement of the apparatus for assembling the laminated ring for the belt shown in FIG. 1, FIGS. 3 and 4 are flowcharts of an operation sequence according to a first embodiment of the present invention.

An apparatus according to the present embodiment serves as an apparatus for assembling the laminated rings 3 of the belt 1. As shown in FIG. 2, the apparatus comprises a component storage facility 10 for classifying and storing ring components $4_1–4_N$ of respective layers of laminated rings 3, a loading device 11 for loading ring components $4_1–4_N$ of respective layers manufactured in a preprocessing station, not shown, and introduced therefrom into the component storage facility 10, an unloading device 12 for unloading set ring components (4) to assemble each laminated ring 3 from the component storage facility 10, a computer 13 for instructing the loading device 11 and the unloading device 12 to operate, and a laminating device 14 for laminating the ring components $4_1–4_N$ unloaded by the unloading device 12 thereby to assemble a laminated ring 3.

Though not shown in detail, the computer 13 includes a basic circuit unit comprising a CPU, a RAM, a ROM, etc., and also includes a recording medium such as a hard disk or the like, input/output devices including a keyboard, a display unit, etc., a communication means (such as a LAN device or the like) for communication with other computers or the like, and software programs for performing various processes. The computer 13 may comprise a single computer or a plurality of personal computers connected together for exchanging data with each other.

The computer 13 has, as its major functional means, a component data managing means 15 for storing and managing component data relative to ring components 4 that are stored by the component storage facility 10, and a processing means 16 for carrying out various processing operations using the component data stored by the component data managing means 15.

The component data stored by the component data managing means 15 are composite data made up of data identifying which layer of a laminated ring 3 each of the ring components 4 in the component storage facility 10 belongs to (hereinafter referred to as "layer identifying data), data representing locations where the ring components 4 are stored by the component storage facility 10 (hereinafter referred to as storage address data), measured data of circumferential length values as size data of the ring components 4, data of production dates of the ring components 4, and data of lot numbers of the ring components 4. The size data may comprise radius or diameter data of the ring components 4 rather than the measured data of circumferential length values of the ring components 4, and may include data of thicknesses, widths, etc. of the ring components 4, if necessary.

Of these data stored by the component data managing means 15, the data (indicated as loaded product production information in FIG. 2) except the storage address data are supplied to the computer 13 via the communication means from a computer (not shown) in a production station (not shown) when the ring components 4 are introduced from the production station into the apparatus. The storage address data are determined by the computer 13 while referring to the layer identifying data, etc. of the loaded product production information, when the introduced ring components 4 are loaded into the component storage facility 10 by the loading device 11.

The computer 13 stores data (loaded ring production information) given from the computer of the production station, in combination with the storage address data, into the component data managing means 15. When a ring component 4 is loaded into the component storage facility 10 or set ring components (4) are unloaded from the component storage facility 10, the computer 13 updates the data stored by the component data managing means 15. Specifically, when a new ring component 4 is loaded into the component storage facility 10, the computer 13 stores the component data of the new ring component 4 together with the component data of the ring components 4 already stored by the component storage facility 10, into the component data managing means 15. When set ring components (4) are unloaded from the component storage facility 10, the computer 13 cancels the storage of the component data of the ring components of the 1st through Nth layers of those set ring components (4), and erases those component data from the component data managing means 15.

The computer 13 stores log data of circumferential length values of ring components 4 of each layer which have been loaded into the component storage facility 10 in the past (e.g., log data of circumferential length values of ring components 4 of each layer which have been loaded into the component storage facility 10 for a given period in the past, or log data of circumferential length values of ring components 4 of each layer in a certain lot which have been loaded into the component storage facility 10 in the past) separately from the data held by the component data managing means 15. As described in detail later on, the processing means 16 has functions as a combinatorial trial calculation means and an unloaded product selecting means in a first aspect of the present invention. In the present embodiment, N ring components $4_1$ through $4_N$ of first through Nth layers are loaded as a set into the component storage facility 10, and the number of ring components 4 of each layer in the component storage facility 10 is basically the same between the layers.

Operation of the apparatus according to the present embodiment will be described in detail below.

Figure 3:
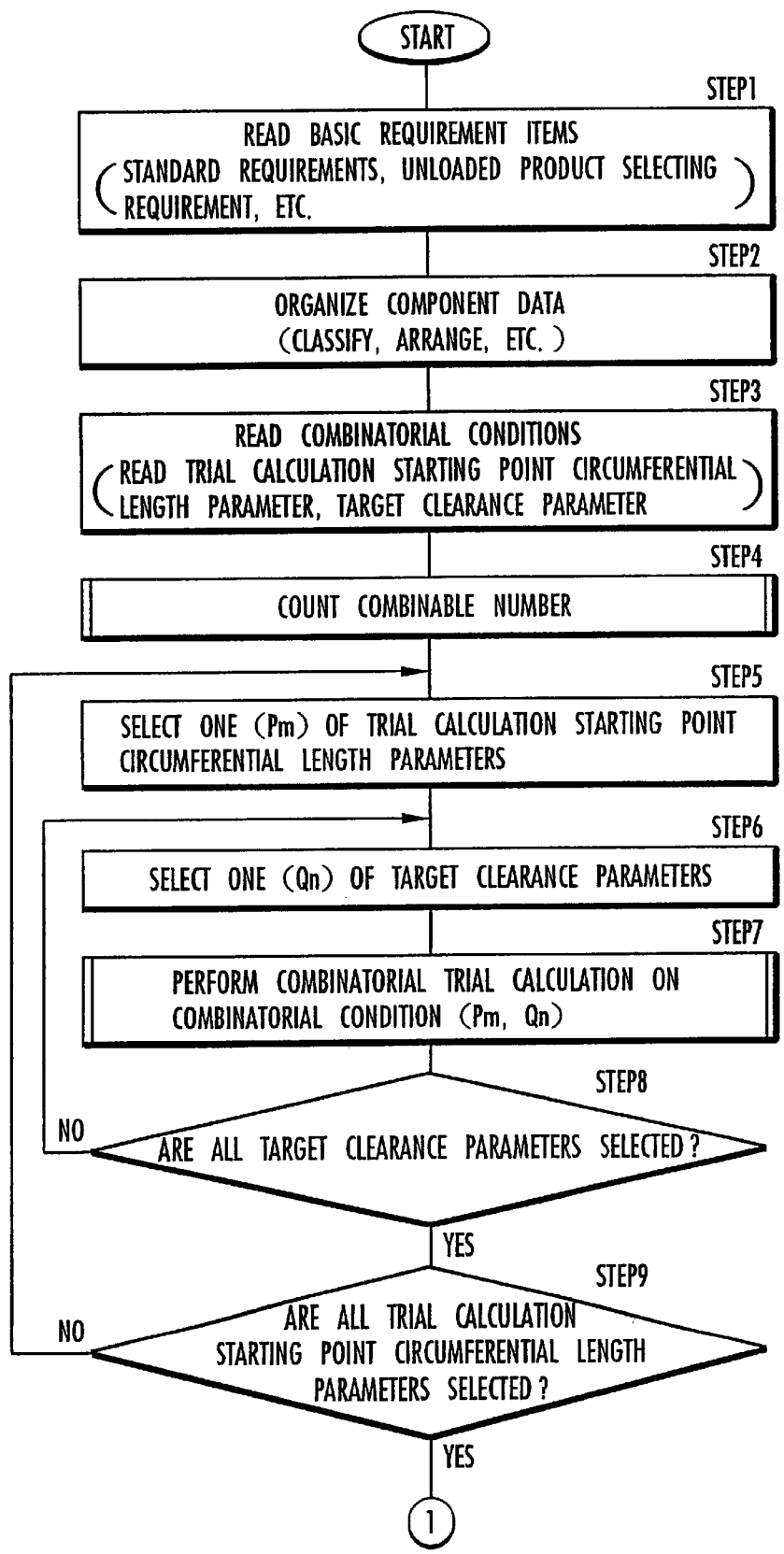
Figure 4:
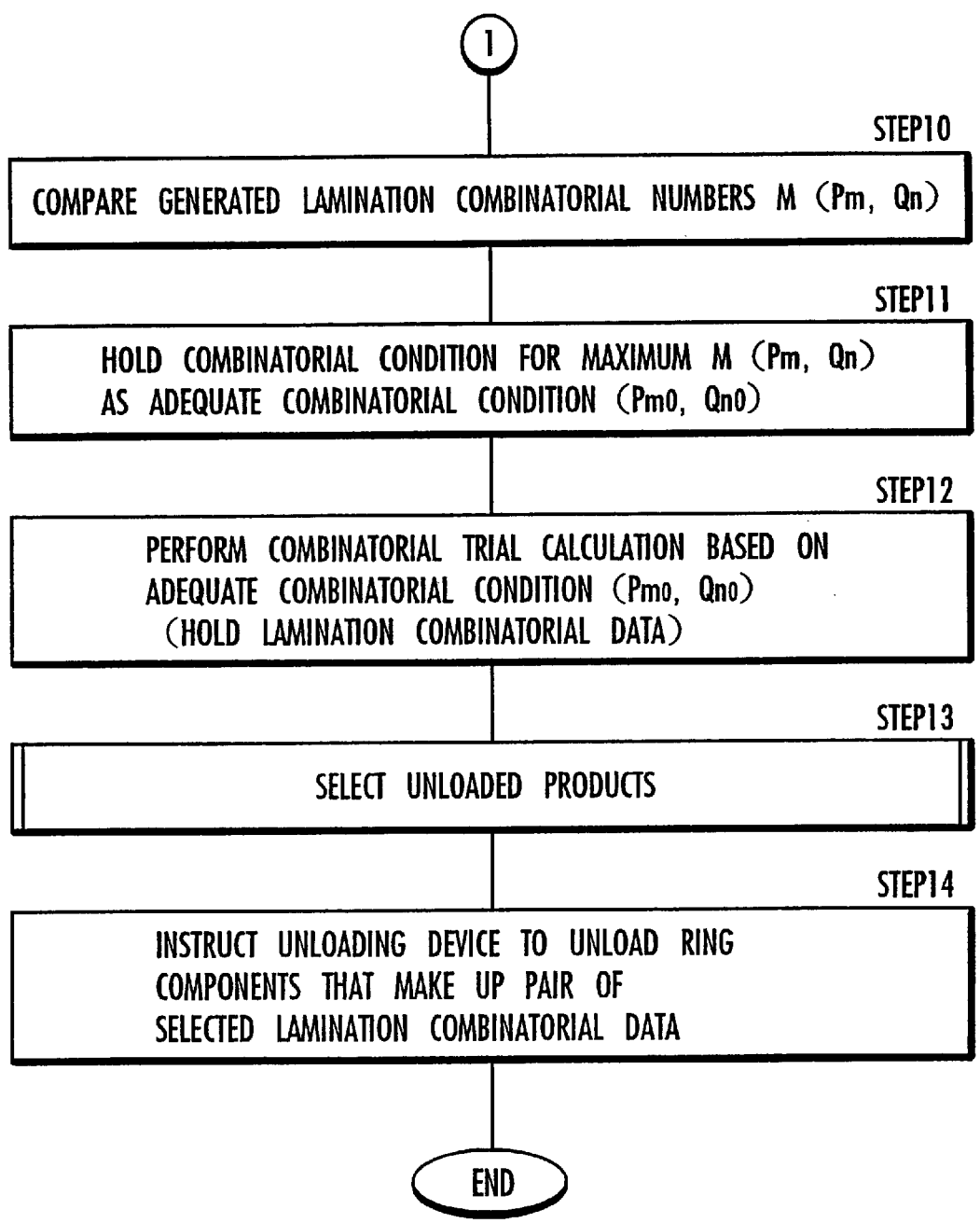

When there is a request to unload set ring components (4), i.e., a request to assemble a laminated ring, the computer 13 executes an operation sequence shown in the flowcharts of FIGS. 3 and 4.

The computer 13 reads basic requirement items, which are required for the processing means 16 to perform processes such as a combinatorial trial calculation, etc., as described later on, into the processing means 16 in STEP1. The requirement items represent standard requirements required as a laminated ring 3 for use in a CVT belt 1, a requirement for selecting a ring component 4 to be unloaded (hereinafter referred to as an unloaded product selecting requirement), etc. These requirement items are supplied to the computer 13 in advance, and saved in a hard disk or the like, not shown.

In the present embodiment, the standard requirements required as a laminated ring 3 include a requirement that prescribes the difference between the radii of ring components 4 of two adjacent layers of a laminated ring 3 (hereinafter referred to as an inter-ring clearance $\Delta r$), a requirement that prescribes the sum of inter-ring clearances $\Delta r$ for all layers (hereinafter referred to as a total clearance $\Sigma \Delta r$), and a requirement that prescribes the absolute value of the difference between the circumferential lengths of ring components $4_1$ of the first layers (innermost layers) of a pair of first and second laminated rings $3a$, $3b$ (see FIG. 1) used to make a CVT belt 1 (hereinafter referred to as a first layer circumferential length difference $\Delta L1$).

The requirement that prescribes the inter-ring clearance $\Delta r$ is determined such that the allowable range for the inter-ring clearance $\Delta r$ is $A\pm\alpha$ [$\mu$m] (where A, $\alpha$ are positive constants), i.e., $A-\alpha \leq \Delta r \leq A+\alpha$. The requirement that prescribes the total clearance $\Sigma \Delta r$ is determined such that the allowable range for the total clearance $\Sigma \Delta r$ is $0 \leq \Sigma \Delta r \leq B$ [$\mu$m] (where B is a positive constant). The requirement that prescribes the first layer circumferential length difference $\Delta L1$ is determined such that the allowable range for the first layer circumferential length difference $\Delta L1$ is $0 \leq \Delta L1 \leq C$ [$\mu$m] (where C is a positive constant).

The inter-ring clearance $\Delta r$ includes N−1 interring clearances which are, specifically, an inter-ring clearance between first and second layers, an inter-ring clearance between second and third layers, . . . , and an inter-ring clearance between (N−1)th and Nth layers. In the present embodiment, the requirement ($A-\alpha \leq \Delta r \leq A+\alpha$) which prescribes the inter-ring clearance $\Delta r$ between any adjacent layers is the same.

Specifically, the inter-ring clearance $\Delta r$ represents the difference between the radius (inside radius) of the inner circumferential surface of the outer one of two adjacent ring components 4 and the radius (outside radius) of the outer circumferential surface of the inner one of two adjacent ring components 4. If the thicknesses of the ring components 4 of the respective layers are constant, then the difference between the inner radii of two adjacent ring components 4, or the difference between the outer radii of two adjacent ring components 4, or the remainder produced when the design value (constant) of the thickness of the ring component 4 of each layer is subtracted from one of these differences. In the present embodiment, the difference between the inner radii of two adjacent ring components 4, which is calculated from the measured values of the circumferential lengths of the inner circumferential surfaces of the ring components 4, is obtained as the inter-ring clearance $\Delta r$ in the process described later on. If the thicknesses of the ring components 4 of the respective layers vary from each other, then it is preferable that the remainder produced when the thickness of the inner ring component 4 is subtracted from the difference between the inner radii of the two adjacent ring components 4 or the remainder produced when the thickness of the outer ring component 4 is subtracted from the difference between the outer radii of the two adjacent ring components 4 be obtained as the inter-ring clearance $\Delta r$.

The unloaded product selecting requirement is a requirement prescribing a priority rank for set ring components (4) to be unloaded. The unloaded product selecting requirement will be described in detail later on.

Then, the computer 13 organizes the component data stored by the component data managing means 15, i.e., organizes the component data of the ring components 4 that are currently stored by the component storage facility 10, in STEP2. Specifically, the computer 13 sorts the component data by classifying the component data by layer or arranging the component data of each layer in the order of the magnitudes of circumferential length data.

Then, the computer 13 reads a plurality of combinatorial conditions for combining component data of respective layers into the processing means 16 in STEP3. Prior to describing the combinatorial conditions, a basic concept of combinatorial trial calculations that are performed by the processing means 16 will first be described below.

In combinatorial trial calculations according to the present embodiment, component data of one ring component $4_1$ are selected from the component data of ring components $4_1$ of the first layer (particular layer) which are stored by the component storage facility 10, and component data of one ring component $4_2$ of the second layer which are to be combined with the selected component data of the ring component $4_1$ are selected. Then, component data of one ring component $4_3$ of the third layer which are to be combined with the selected component data of the first and second layers are selected. Similarly, component data of successive ring components are selected from the component data of ring components of the fourth, fifth, . . . , Nth layers. In this manner, lamination combinatorial data (corresponding to the set ring components (4)) is generated which represents a combination of the component data of all the layers (N layers) of a laminated ring 3. The above process of generating lamination combinatorial data is repeated to generate a plurality of lamination combinatorial data. Each time lamination combinatorial data is generated, the component data of the layers included in the generated lamination combinatorial data are excluded from the component data that can be selected in subsequent processes of generating new lamination combinatorial data.

In the present embodiment, the combinatorial conditions for carrying out the above combinatorial trial calculations include a trial calculation starting point selecting condition that prescribes a sequence in which to select component data of ring components $4_1$ of the first layer, and an interlayer selecting condition that prescribes which component data of an adjacent (i+1)th layer is to be selected when component data of one component of an ith layer (i=1, 2, . . . , N−1) is selected. These selecting conditions are determined as follows:

The trial calculation starting point selecting condition is basically determined in order to select component data of the first layer in a sequence from those having circumferential length value data closer to a particular circumferential length value. In the present embodiment, the particular circumferential length value is used as a variably set parameter, and a plurality of kinds of trial calculation starting point selecting conditions are set by setting the parameter (hereinafter referred to as a trial calculation starting point circumferential length parameter) to a plurality of kinds of values. In the present embodiment, a plurality of kinds (e.g., 10 kinds) of values that can be used as values of the trial calculation starting point circumferential length parameter, or set data that prescribe those values, are determined in advance, and stored in the hard disk or the like of the computer 13.

The interlayer selecting condition is basically determined in order to select component data whose interring clearance $\Delta r$ satisfies the standard requirement ($A-\alpha \leq \Delta r \leq A+\alpha$) and is closest to a particular target value with respect to the component data of the selected ith layer (i=1, 2, ..., N−1), from the component data of the (i+1)th layer while the above combinatorial calculations are being carried out. In the present embodiment, the above particular target value for the inter-ring clearance $\Delta r$ is used as a variably set parameter, and a plurality of kinds of interlayer selecting conditions are set by setting the parameter (hereinafter referred to as a target clearance parameter) to a plurality of kinds of values. As with the trial calculation starting point circumferential length parameter, a plurality of kinds (e.g., 10 kinds) of values that can be used as values of the target clearance parameter, or set data that prescribe those values, are determined in advance, and stored in the hard disk or the like of the computer 13.

In STEP3, the computer 13 reads the values of the plural kinds of trial calculation starting point circumferential length parameter and the values of the plural kinds of target clearance parameter as parameters that prescribe a plurality of combinatorial conditions into the processing means 16. The number of kinds of combinatorial conditions including trial calculation starting point selecting conditions and interlayer selecting conditions is represented by the product of the number of kinds of trial calculation starting point selecting conditions (=the number of kinds of values of the trial calculation starting point circumferential length parameter) and the number of kinds of interlayer selecting conditions (=the number of kinds of values of the target clearance parameter), e.g., 10×10=100 kinds.

In the description which follows, the number of kinds of values of the trial calculation starting point circumferential length parameter is represented by X and those values are represented by $P_1, P_2, ..., P_x$. Similarly, the number of kinds of values of the target clearance parameter is represented by Y, and those values are represented by $Q_1, Q_2, ..., Q_Y$.

Then, the computer 13 performs a process of counting, in advance, the number of component data among the component data of each of the first through (N−1)th layers stored by the component data managing means 15, which can be combined with component data of a next adjacent layer (one of the second through Nth layers), or more specifically the number of component data whose inter-ring clearance $\Delta r$ satisfies the standard requirement ($A-\alpha \leq \Delta r \leq A+\alpha$), i.e., a combinable number counting process, in STEP4.

Figure 5:
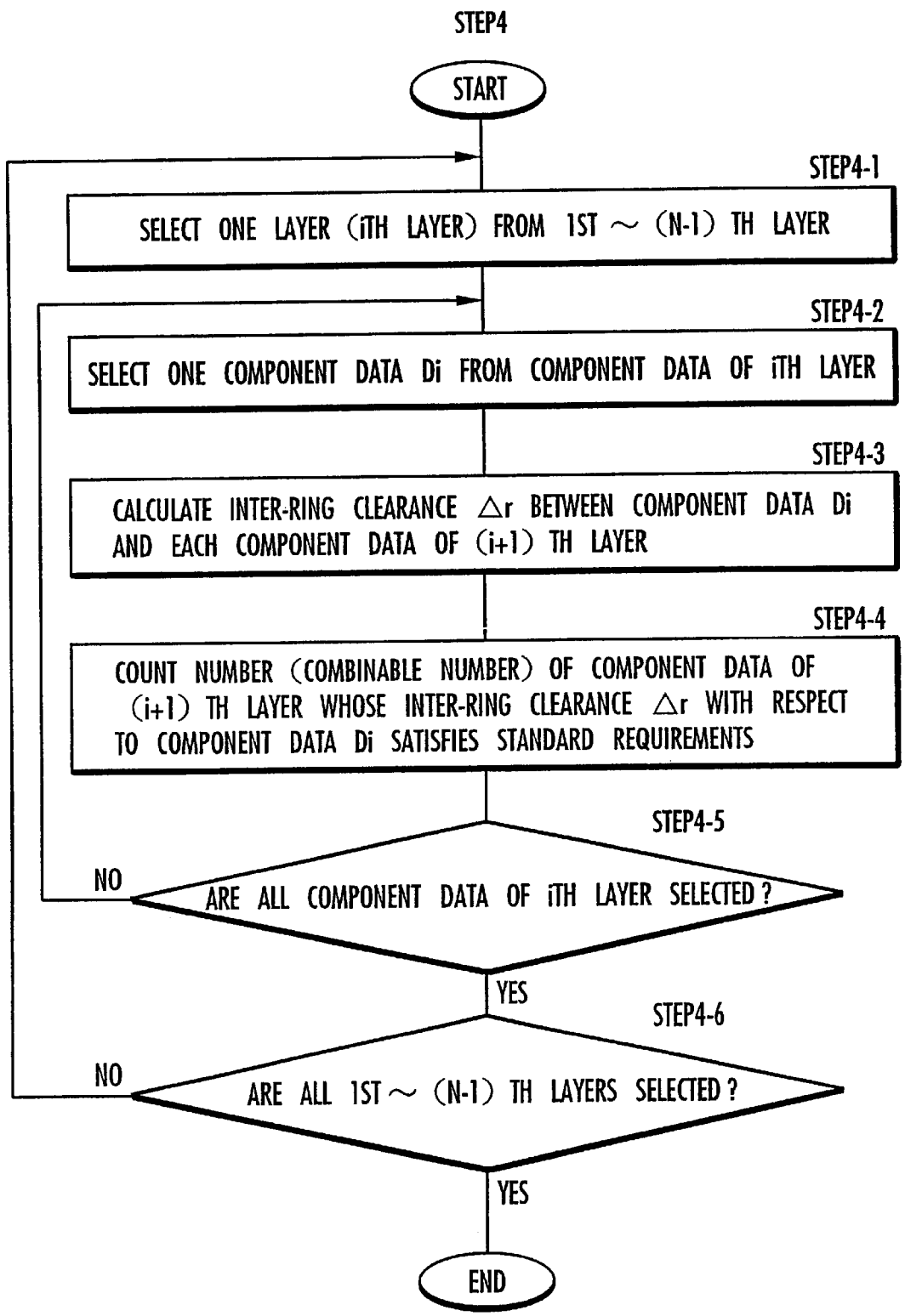
FIGS. 5 through 7 are flowcharts of subroutines of the flowchart shown in FIG. 3.

The combinable number counting process is carried out according to a flowchart shown in FIG. 5.

First, the computer 13 selects one (ith layer) of first through (N−1)th layers in STEP4-1. Then, the computer 13 select one component data Di from the component data of the selected ith layer in STEP4-2.

The computer 13 calculates the inter-ring clearances $\Delta r$ between the component data Di of the selected ith layer and each of the component data of an (i+1)th layer that is adjacent to the ith layer in STEP4-3. The computer 13 then counts the number of component data of the (i+1)th layer whose inter-ring clearance $\Delta r$ satisfies the standard requirement ($A-\alpha \leq \Delta r \leq A+\alpha$), as a combinable number relative to the component data Di of the ith layer in STEP4-4. The inter-ring clearance $\Delta r$ is calculated from the circumferential length value data of the component data Di and the circumferential length value data of each component data of the (i+1)th layer (this calculation is also applicable below).

The counter number is stored by association with the component data Di of the ith layer into the component data managing means 15.

Then, the computer 13 decides whether all the component data of the presently selected ith layer have been selected in STEP4-2 or not in STEP4-5. If there are any unselected component data of the ith layer, then the processing from STEP4-2 is repeated. In this case, the computer 13 selects one of the unselected component data from the component data of the ith layer in STEP4-2.

The computer 13 may select the component data of the ith layer one by one in STEP4-2 by, for example, selecting the component data of the ith layer according to the sequence in which the component data are stored by the component data managing means 15 with respect to the ith layer, or selecting the component data of the ith layer according to the sequence of the magnitudes of the circumferential value data included in the component data of the ith layer.

If it is confirmed in STEP4-5 that all the component data of the presently selected ith layer have been selected in STEP4-2, then the computer 13 decides whether all the first through (N−1)th layers have been selected in STEP4-1 or not in STEP4-6. If there are any unselected layers, then the computer 13 repeats the processing from STEP4-1. In this case, the computer 13 selects one of the unselected layers from the component data from the first through (N−1)th layers in STEP4-1.

The computer 13 may select the first through (N−1)th layers one by one in STEP4-1 by selecting those layers sequentially from the first layer.

If it is confirmed in STEP4-6 that all the layers have been selected in STEP4-1, then control returns to the main routine shown in FIG. 3.

According to the above processing in STEP4, the number of component data whose inter-ring clearance $\Delta r$ satisfies the standard requirement, among all the component data of each of the first through (N−1)th layers stored by the component data managing means 15, is counted in advance as a combinable number. The combinable number thus counted is stored by association with the component data of each of the first through (N−1)th layers into the component data managing means 15. The component data of the Nth layer are excluded from the processing in STEP4 because they are finally selected and combined in the combinatorial trial calculations whose brief concept has been described above.

Referring back to the flowchart shown in FIG. 3, the processing means 16 of the computer 13 selects one trial calculation starting point circumferential length parameter Pm from the plural (X) trial calculation starting point circumferential length parameters $P_1, P_2, ..., P_X$ relative to the plural kinds of trial calculation starting point selecting conditions that have been read in STEP3, in STEP5.

Then, the processing means 16 selects one target clearance parameter Qn from the plural (Y) target clearance parameters $Q_1, Q_2, ..., Q_Y$ relative to the plural kinds of interlayer selecting conditions that have been read in STEP3, in STEP6. Now, one combinatorial condition is set from among the plural kinds (X×Y) of combinatorial conditions that are determined by the trial calculation starting point circumferential length parameters and the target clearance parameters.

The processing means 16 then effects a combinatorial trial calculation on the component data stored by the component data managing means 15 based on one kind of combinatorial condition (hereinafter referred to as combinatorial condition (Pm, Qn)) that is determined from the set of the selected trial calculation starting point circumferential length parameter Pm and the selected target clearance parameter Qn in STEP7.

Figure 6:
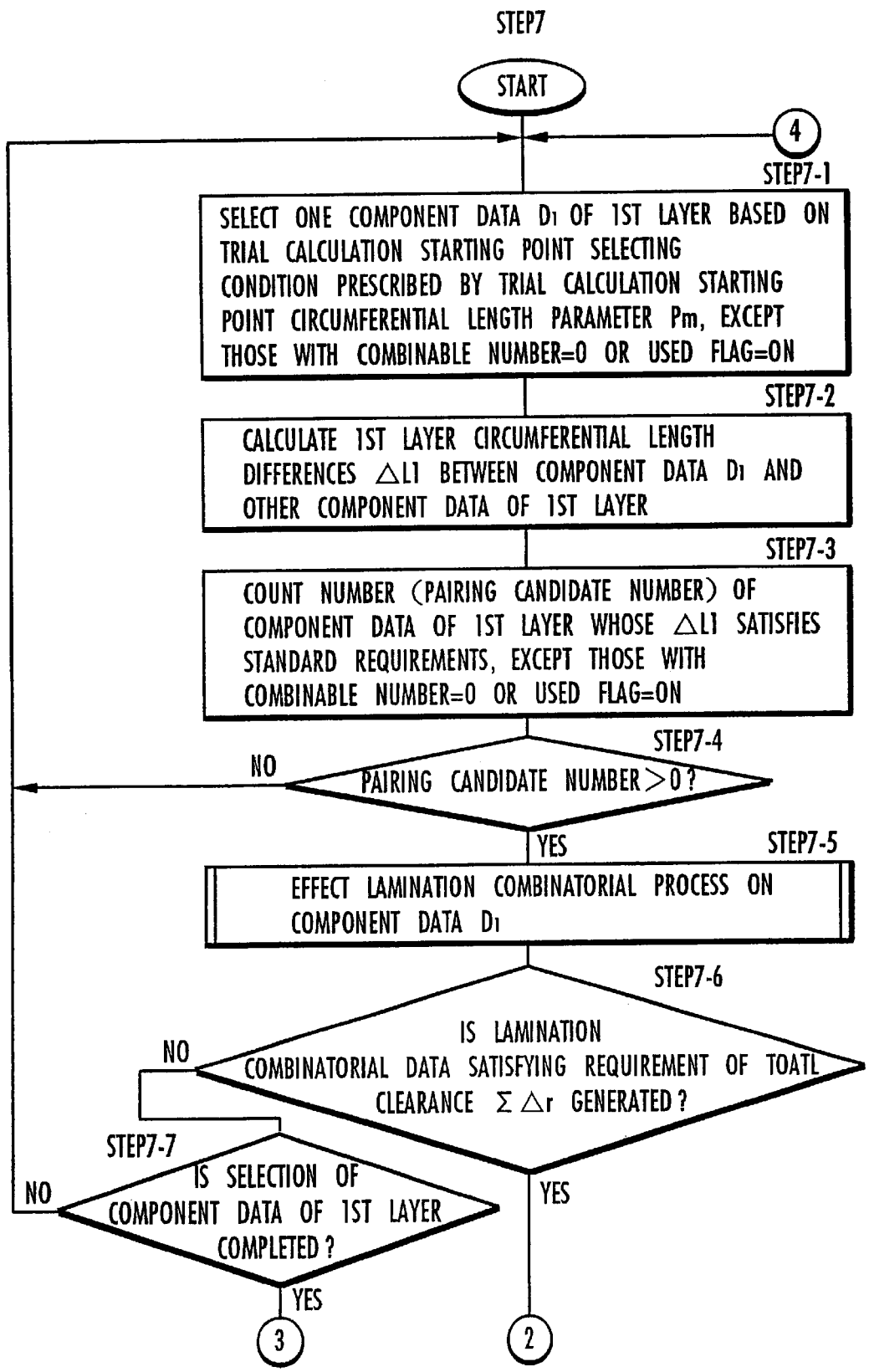
Figure 7:
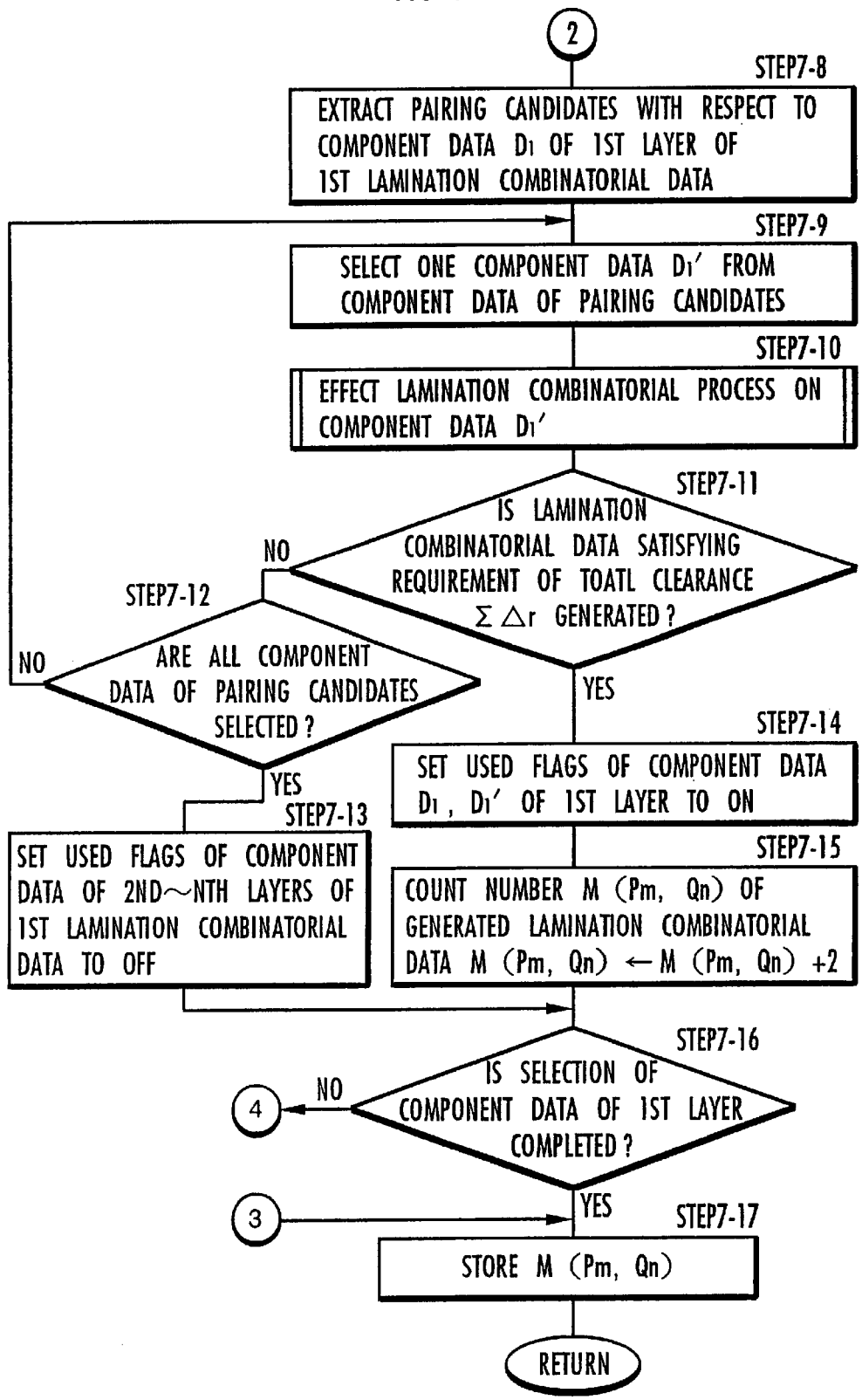
Figure 8:
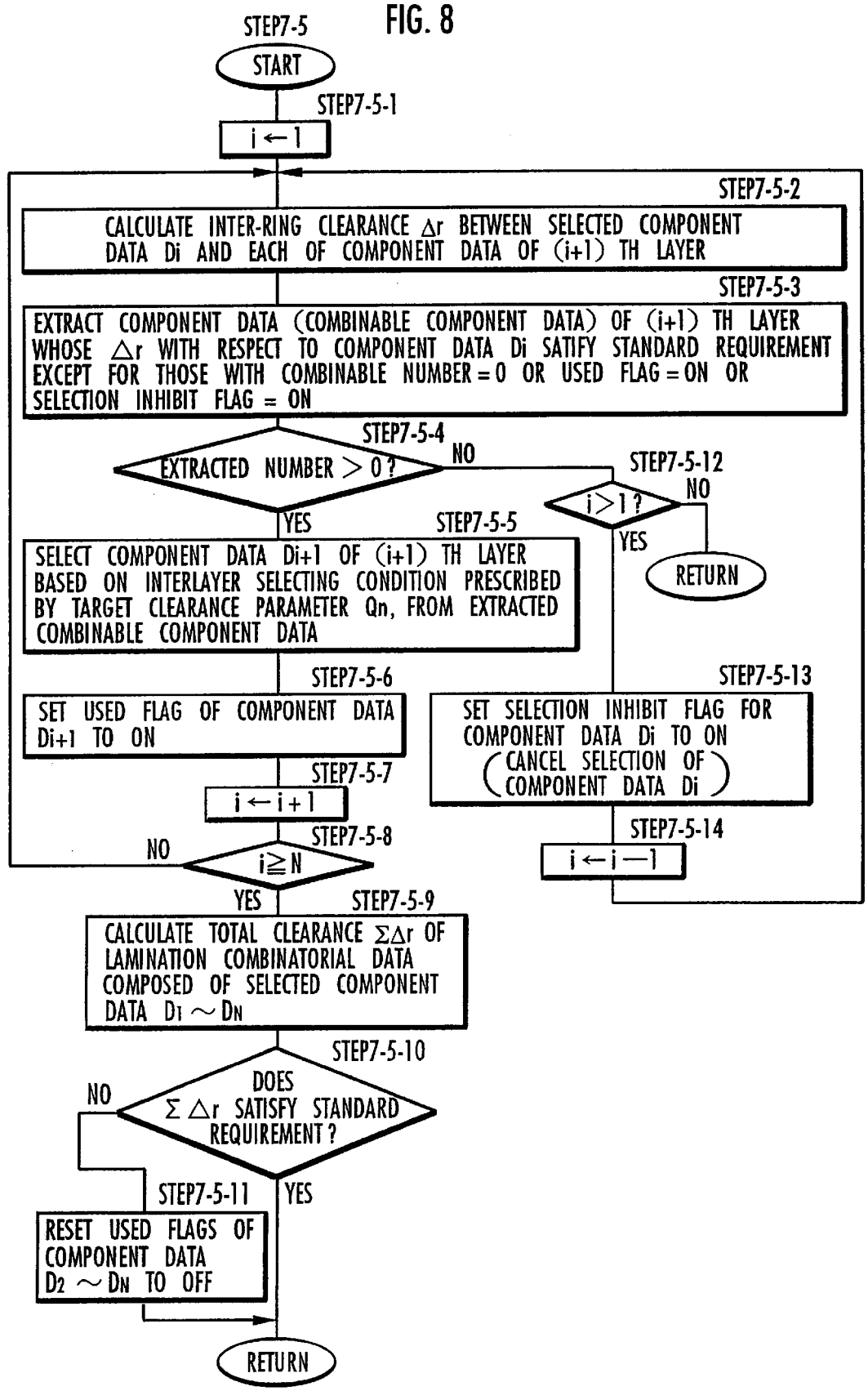
FIG. 8 is a flowchart of a subroutine of the flowchart shown in FIG. 6.

The combinatorial trial calculation is carried out according to flowcharts shown in FIGS. 6 through 8.

In FIG. 6, the processing means 16 selects one component data $D_1$ from the component data of the first layer based on the trial calculation starting point selecting condition prescribed by the trial calculation starting point circumferential length parameter Pm selected in STEP5 in STEP7-1.

Specifically, the trial calculation starting point selecting condition prescribed by the trial calculation starting point circumferential length parameter Pm that is being currently set basically prescribes a sequence in which to select the component data of the first layer as by selecting the component data $D_1$ of the first layer, one by one, in a sequence from those having circumferential length value data closer to the value of the parameter Pm. The processing in STEP8-1 is repeatedly carried out during the combinatorial trial calculation according to one kind of combinatorial condition (Pm, Qn). In STEP8-1, basically, one component data $D_1$ of the first layer is selected according to the selecting sequence that is determined depending on the trial calculation starting point circumferential length parameter Pm as described above each time the processing in STEP7-1 is carried out.

The component data of the first layer whose combinable number counted in advance in STEP4 is "0" or whose used flag is ON are excluded from the component data that can be selected in STEP7-1.

The used flag is set to ON as described later on during the combinatorial trial calculation with respect to the component data of each of the first through Nth layers. When the processing in STEP7 is started, the used flag is initialized to OFF with respect to all the component data of all the layers.

If there are a plurality of component data have the same circumferential length value data in STEP7-1, then one of the component data is selected according to the sequence the component data are stored by the component data managing means 15, or one of the component data is selected in view of the production date data or the lot number data included in the component data.

Then, the processing means 16 calculates the absolute values of the differences between the circumferential length value data of the component data $D_1$ selected in STEP7-1 and the circumferential length value data of all the other component data of the first layer, i.e., the first layer circumferential length differences ΔL1, in STEP7-2. The processing means 16 counts the number (hereinafter referred to as a pairing candidate number) of component data of the first layer, as pairing candidates for the component data $D_1$, whose first layer circumferential length differences ΔL1 satisfy the standard requirement 0≦ΔL1≦C in STEP7-3.

At this time, the component data whose combinable number counted in advance in STEP4 is "0" or whose used flag is ON are excluded from the pairing candidates that can be counted.

The pairing candidate number thus counted represents the number of other component data of the first layer which can possibly be paired with the component data $D_1$ of the first layer selected in STEP7-1, with respect to the pair of laminated rings 3 that make up the CVT belt 1.

Then, the processing means 16 decides whether the pairing candidate number counted in STEP7-3 is "0" or not in STEP7-4. If the pairing candidate number is "0", i.e., if it is impossible to generate lamination combinatorial data to be paired with generated lamination combinatorial data including the component data $D_1$, then control returns to STEP7-1 to select new component data $D_1$ of the first layer. This is because in the present embodiment two laminated rings 3 are assembled as one set since an individual CVT belt 1 needs a pair of laminated rings 3.

If the component data $D_1$ of the first layer whose pairing candidate number is not "0" is selected in STEP7-1 and that selection is confirmed in STEP7-4, then the processing means 16 performs a lamination combinatorial process to combine the component data of the second through Nth layers, one by one, with the component data $D_1$ of the first layer, thereby generating lamination combinatorial data in STEP7-5.

The lamination combinatorial process is carried out according to a flowchart shown in FIG. 8.

The processing means 16 initializes the value of a parameter i indicative of a layer number to "1" in STEP7-5-1. Then, the processing means 16 calculates the interring clearance Δr between the presently selected component data Di of the ith layer and each of the component data of the (i+1)th layer, using the circumferential length value data of the component data, in STEP7-5-2. Since i=1 in an initial stage of the lamination combinatorial process, the component data Di of the ith layer is the component data $D_1$ of the first layer selected in STEP7-1 through STEP7-4.

Then, the processing means 16 extracts component data whose inter-ring clearances Δr calculated in STEP7-5-2 satisfy the standard requirement (A−α≦Δr≦A+α) from the component data of the (i+1)th layer, as combinable component data with respect to the component data Di of the ith layer, in STEP7-5-3.

However, of the component data of the (i+1)th layer, those component data whose combinable number counted in advance in STEP4 is "0" or whose used flag or selection inhibit flag is ON are excluded from the component data that can be extracted.

The selection inhibit flag is set to ON in STEP7-5-13, described later on, if there is no combinable component data with respect to each of the component data of the second through (N−1)th layers. As with the used flag, the selection inhibit flag is initialized to OFF with respect to all the component data of the second through (N−1)th layers when the processing in STEP7 is started.

When i=N−1 in extracting combinable component data in STEP7-5-3, the condition as to whether the combinable number relative to the component data of the (i+1)th layer (=Nth layer) is "0" or not and the condition as to whether the selection inhibit flag is ON or not are ignored. This is because since the component data of the Nth layer are finally selected in obtaining lamination combinatorial data, no combinable number is calculated in STEP4 and the selection inhibit flag is not set to ON in STEP7-5-13. Therefore, when i=N−1 in extracting combinable component data in STEP7-5-3, those component data whose inter-ring clearances Δr with respect to the selected component data $D_{N-1}$ of the (N−1)th layer satisfy the standard requirement ($A-\alpha \leq \Delta r \leq A+\alpha$) and whose used flags are not ON are selected from among the component data of the Nth layer (=(i+1)th layer).

Then, the processing means 16 decides whether the number of combinable component data extracted in STEP7-5-3 is "0" or not in STEP7-5-4.

If the number of extracted combinable component data ≠0 (>0), i.e., if there is at least one component data of the (i+1)th layer which can be combined with the selected component data Di of the ith layer, then the processing means 16 selects one component data Di+1 to be combined with the already selected component data $D_1$–Di of the first through ith layers based on the interlayer selecting condition prescribed by the present target clearance parameter Qn set in STEP6, from the extracted combinable component data of the (i+1)th layer in STEP7-5-5. That is, the component data Di+1 whose ring clearance $\Delta r$ calculated in STEP7-5-2 with respect to the component data Di of the ith layer is closest to the value of the presently set target clearance parameter Qn is selected from the extracted combinable component data.

Then, the processing means 16 sets the used flag of the newly selected component data Di+1 of the (i+1)th layer to ON in STEP7-5-6.

The processing means 16 increments the value of the layer number i from the present value by "1" in STEP7-5-7, and then decides whether or not the incremented value of the layer number i is equal to or greater than the number N of the layers of a laminated ring 3 in STEP7-5-8. If i<N, then the processing from STEP7-5-2 is repeated. If i≧N, i.e., if the component data of all the layers ranging from the first through Nth layers have been selected one by one and lamination combinatorial data composed of the component data $D_1$–$D_N$ of each of those layers has been generated, then the processing means 16 calculates a total clearance $\Sigma \Delta r$ relative to the generated lamination combinatorial data in STEP7-5-9. The processing means 16 decides whether the calculated total clearance $\Sigma \Delta r$ satisfies the standard requirement ($0 \leq \Sigma \Delta r \leq B$) or not in STEP7-5-10. If the calculated total clearance $\Sigma \Delta r$ satisfies the standard requirement ($0 \leq \Sigma \Delta r \leq B$), then the processing means 16 finishes the lamination combinatorial process in STEP7-5. Control then returns to the processing sequence shown in FIG. 6.

If the calculated total clearance $\Sigma \Delta r$ does not satisfy the standard requirement ($0 \leq \Sigma \Delta r \leq B$) in STEP7-5-10, then the processing means 16 resets the used flag, which has been set to ON with respect to each of the component data of the second through Nth layers in the lamination combinatorial data, to OFF in STEP7-5-11. Control then returns to the processing sequence shown in FIG. 6.

The above processing sequence is a basic sequence of the lamination combinatorial process. As described above, the component data $D_2$–$D_N$ of each of the second through Nth layers are successively selected one by one with respect to the component data $D_1$ of the first layer which has been selected and determined in the processing ranging from STEP7-1 through STEP7-4, and they are combined into one lamination combinatorial data.

If the number of extracted combinable component data is "0" in STEP7-5-4, i.e., if there is no component data of the (i+1)th layer that can be combined with the selected component data Di of the ith layer, then the processing means 16 performs the following processing sequence:

If the number of extracted combinable component data is "0" in STEP7-5-4, then the processing means 16 determines the value of the present layer number i in STEP 75-12. If i=1, then since it is impossible to generate lamination combinatorial data including the component data $D_1$ of the first layer, the lamination combinatorial process is finished, and control returns to the processing sequence shown in FIG. 6.

If i>1 in STEP 7-5-12, then the processing means 16 sets the selection inhibit flag relative to the presently selected component data Di of the ith layer to ON in STEP7-5-13. At this time, the selection of the component data Di of the ith layer is canceled, and the component data $D_1$ through Di–1 of the first through (i–1)th layers are selected.

The processing means 16 decrements the value of the layer number i by "1" in step S7-5-14, after which control goes back to the processing in STEP7-5-2.

Specifically, if the number of extracted combinable component data of the (i+1)th layer that can be combined with the selected component data Di of the ith layer (i>1) in STEP7-5-3 is "0", then the selection of the component data Di of the ith layer is canceled, and the processing goes back to a preceding layer (=(i–1)th layer) to extract again combinable component data of the ith layer with respect to the already selected component data Di–1 of the (i–1)th layer. In STEP7-5-5, the component data Di of the ith layer to be combined with the component data Di–1 of the (i–1)th layer is selected from the extracted combinable component data.

Since the selection inhibit flag for the previously selected component data of the ith layer is set to ON in STEP7-5-13, the component data will not subsequently be extracted as combinable component data that can be combined with the component data of the (i–1)th layer, and will not subsequently be extracted as component data making up lamination combinatorial data in STEP7-5-5.

More specifically, with the component data $D_1$ through $D_3$ of the first through third layers, for example, being selected, if the number of combinable component data of the fourth layer which have been extracted in STEP7-5-3 with respect to the component data $D_3$ of the third layer is "0", then combinable component data of the third layer are extracted again with respect to the already selected component data $D_2$ of the second layer. Basically, then, the component data of the third layer which make up lamination combinatorial data are selected again in STEP7-5-5 from the newly extracted combinable component data (which do not include the previously selected component data $D_3$ of the third layer).

When the extracting process in STEP7-5-3 is carried out again as described above, setting the selection inhibit flag for the previously selected component data Di (component data $D_3$ of the third layer in the above example) of the ith layer to ON may possibly cause the number of combinable component data extracted again in STEP7-5-3 to be "0". In this case, control goes through the decision process in STEP7-5-4 to the processing in STEP 7-5-13 and STEP7-5-14 thereby to trace back the layer number i for selecting component data.

Referring back to FIG. 6, after having carried out the lamination combinatorial process in STEP7-5, the processing means 16 decides whether lamination combinatorial data satisfying the standard requirement of the total clearance $\Sigma \Delta r$ is generated or not in STEP7-6.

If the lamination combinatorial process in STEP7-5 has been finished via STEP7-5-11 or STEP7-5-12, then no lamination combinatorial data satisfying the standard requirement of the total clearance $\Sigma \Delta r$ is generated. In this case, the processing means 16 decides whether all the component data of the first layer (except those with the combinable number="0" or the used flag=ON) have been selected in STEP7-1 or not in STEP7-7. If there are any unselected component data, then control goes back to STEP7-1 to select new component data $D_1$ of the first layer. If there are no unselected component data, then control goes to STEP7-17 described later on.

If lamination combinatorial data satisfying the standard requirement of the total clearance $\Sigma\Delta r$ is generated according to the lamination combinatorial process in STEP7-5, i.e., if the answer to STEP7-5-10 is YES, then the processing means 16 confirms the generation of lamination combinatorial data in STEP7-6, and performs a process of generating lamination combinatorial data to be paired with the above lamination combinatorial data from STEP7-8 shown in FIG. 8. In the following description, the lamination combinatorial data generated in STEP7-5 is associated with the first laminated ring 3a for the CVT belt 1 and referred to as first lamination combinatorial data, and lamination combinatorial data generated as described below is paired with the first lamination combinatorial data and referred to as second lamination combinatorial data (corresponding to the second laminated ring 3b).

After having generated the first lamination combinatorial data in STEP7-5, the processing means 16 extracts the pairing candidates, which have been counted in STEP7-3, with respect to the component data $D_1$ of the first layer of the first lamination combinatorial data, from the component data of the first layer in STEP7-8.

Then, the processing means 16 selects one component data $D_1'$ from the component data of the pairing candidates of the first layer in STEP7-9. While the selected component data $D_1'$ may be any arbitrary component data, one component data having circumferential length value data closer to the value of the circumferential length value data of the component data $D_1'$ of the first layer of the first lamination combinatorial data, for example, is preferentially selected. At this time, it has been confirmed in STEP7-4 that the number of pairing candidates is at least one.

The processing means 16 performs a lamination combinatorial process to combine the component data of the second through Nth layers, one by one, with the component data $D_1'$ of the first layer selected in STEP7-9 to generate lamination combinatorial data in STEP7-10. This lamination combinatorial process is carried out exactly in the same manner as the lamination combinatorial process in STEP7-5.

Then, the processing means 16 decides, in exactly the same manner as with the decision process in STEP7-6, whether lamination combinatorial data (second lamination combinatorial data) satisfying the standard requirement of the total clearance $\Sigma\Delta r$ ($0 \leq \Sigma\Delta r \leq B$) is generated according to the lamination combinatorial process in STEP7-10 or not in STEP7-11.

If no lamination combinatorial data satisfying the standard requirement of the total clearance $\Sigma\Delta r$ is generated, the processing means 16 decides whether all the component data of the pairing candidates extracted in STEP7-8 have been selected in STEP7-9 or not in STEP7-12. If there are any unselected pairing candidates, then control goes back to STEP7-9 in which the processing means 16 selects one new component data $D_1'$ from the component data of the pairing candidates and then to STEP7-10 in which the processing means 16 performs the lamination combinatorial process in. When the processing in STEP7-9 is thus repeated, component data $D_1'$ are selected from the component data of the pairing candidates in a sequence from those having circumferential length value data closer to the circumferential length value data of the component data $D_1'$ of the first layer of the first lamination combinatorial data, for example.

If the selection of all the pairing candidates in STEP7-9 is completed as confirmed in STEP7-12 (in this case, any second lamination combinatorial data satisfying the standard requirement of the total clearance $\Sigma\Delta r$ is not generated), then the processing means 16 resets the used flags (which have been set to ON in STEP7-5) relative to the component data $D_2$–$D_N$ of each of the second through Nth layers of the first lamination combinatorial data to OFF in STEP7-13, after which control goes to STEP7-16 described later on.

If it is confirmed in STEP7-11 that second lamination combinatorial data (lamination combinatorial data to be paired with the first lamination combinatorial data) satisfying the standard requirement of the total clearance $\Sigma\Delta r$ is generated according to the lamination combinatorial process in STEP7-10, then the processing means 16 sets used flags relative to the component data $D_1$ of the first layer of the first lamination combinatorial data and the component data $D_1'$ of the first layer of the second lamination combinatorial data to ON in STEP7-14. Thereafter, the processing means 16 counts the number M (Pm, Qn) of lamination combinatorial data generated up to present with respect to one kind of combinatorial condition (Pm, Qn) set in STEP 5 and STEP6 (see FIG. 3) in STEP7-15. The counting process is carried out by adding "2" which is the number of lamination combinatorial data successively generated in STEP7-5 and STEP7-10 to the present value of the number M (Pm, Qn) (hereinafter referred to as a generated lamination combinatorial number M (Pm, Qn)). The generated lamination combinatorial number M (Pm, Qn) has been initialized to "0" at the time of starting the processing in STEP7, for example.

As described above, the lamination combinatorial data are basically generated as a pair of first and second lamination combinatorial data. If first lamination combinatorial data satisfying the standard requirement of the total clearance $\Sigma\Delta r$ is generated and second lamination combinatorial data to be paired with the first lamination combinatorial data is not generated, then the generated lamination combinatorial number M (Pm, Qn) is not counted up. According to the present embodiment, therefore, the generated lamination combinatorial number M (Pm, Qn) is an even number, and a value produced by dividing the generated lamination combinatorial number M (Pm, Qn) by "2" represents the number of pairs of generated first and second lamination combinatorial data.

If second lamination combinatorial data satisfying the standard requirement of the total clearance $\Sigma\Delta r$ is not generated, then since the used flags relative to the component data $D_2$–$D_N$ of the second through Nth layers of the previously generated first lamination combinatorial data are set to OFF, these component data $D_2$–$D_N$ are left as candidates for component data of the first or second lamination combinatorial data.

If a pair of first and second lamination combinatorial data both satisfying the standard requirement of the total clearance $\Sigma\Delta r$ is generated, then since the used flags relative to the component data $D_1$, $D_1'$ of the first layer of those lamination combinatorial data are set to ON, those component data $D_1$, $D_1'$ of the first layer will not subsequently be selected as elements of lamination combinatorial data in STEP7-1 or STEP7-9. The component data $D_1$ of the first layer of the first lamination combinatorial data generated in STEP7-5 is selected only once in STEP7-1 even if the used flag thereof is OFF (because the component data of the first layer are sequentially selected according to the trial calculation starting point selecting condition in STEP7-1). However, if the used flag of the component data $D_1$ is OFF, then the component data $D_1$ may be selected as component data of the first layer of the second lamination combinatorial data in STEP7-9.

After the generated lamination combinatorial number M (Pm, Qn) has been counted in STEP7-15 or after the processing in STEP7-13 has been carried out without generating second lamination combinatorial data, the processing means 16 decides whether the selection of the component data $D_1$ of the first layer in STEP7-1 has been completed or not, i.e., whether the selection of all the component data $D_1$ of the first layer (except those with the combinable number= "0" or the used flag=ON) based on trial calculation starting point selecting condition has been completed or not, in STEP7-16. If there are unselected component data of the first layer, then the processing from STEP7-1 shown in FIG. 6 is repeated.

If the selection of the component data of the first layer has been completed as confirmed in STEP7-16 or STEP7-7, then the processing means 16 stores the finally obtained value of the generated lamination combinatorial number M (Pm, Qn) in the component data managing means 15 in association with the presently set combinatorial condition (Pm, Qn) in STEP7-17.

The combinatorial trial calculation in STEP7 shown in FIG. 3 (the combinatorial trial calculation based on one combinatorial condition (Pm, Qn)) is thus finished, and the generated lamination combinatorial number M (Pm, Qn) corresponding to the combinatorial condition (Pm, Qn), i.e., the total number of lamination combinatorial data that can be generated based on the combinatorial condition (Pm, Qn), is determined.

Referring back to the flowchart of FIG. 3, after having performed the combinatorial trial calculation based on one kind of combinatorial condition prescribed by the trial calculation starting point circumferential length parameter Pm and the target clearance parameter Qn which are set in STEP5 and STEP6, the processing means 16 decides whether all target clearance parameters $Q_1$ through $Q_Y$ read in STEP3 have been selected in STEP6 or not in STEP8. If there is an unselected target clearance parameter, then the processing means 16 selects the unselected target clearance parameter Qn in STEP6 (at this time, the value of the trial calculation starting point circumferential length parameter Pm remains as it is), and the combinatorial trial calculation in STEP7 is carried out as described above based on a combinatorial condition (Pm, Qn) that is prescribed by the newly selected target clearance parameter Qn and the presently selected trial calculation starting point circumferential length parameter Pm.

The processing means 16 selects the target clearance parameters $Q_1$ through $Q_Y$, one by one, in STEP6 by sequentially selecting the target clearance parameters $Q_1$ through $Q_Y$ in the order of their magnitudes.

If the selection of the target clearance parameters has been completed in STEP6 as confirmed in STEP8, then the processing means 16 decides whether all trial calculation starting point circumferential length parameters $P_1$ through $P_X$ read in STEP3 have been selected in STEP5 or not in STEP9. If there is an unselected trial calculation starting point circumferential length parameter, then the processing means 16 selects the unselected trial calculation starting point circumferential length parameter Pm in STEP5. After one target clearance parameter Qn is selected, the combinatorial trial calculation in STEP7 is carried out as described above based on a combinatorial condition (Pm, Qn) that is prescribed by the trial calculation starting point circumferential length parameter Pm and the target clearance parameter Qn which have thus been selected.

The processing means 16 selects the trial calculation starting point circumferential length parameters Pm, one by one, in STEP5 by sequentially selecting the trial calculation starting point circumferential length parameters $P_1$ through $P_X$ in the order of their magnitudes, as with STEP5.

The combinatorial trial calculation in STEP7 is carried out for each of (X×Y) combinatorial conditions (Pm, Qn) that are prescribed by the X trial calculation starting point circumferential length parameters $P_1$–$P_X$ and the Y target clearance parameters $Q_1$–$Q_Y$ that read in STEP3 to generate lamination combinatorial data that satisfy the standard requirement of the total clearance $\Sigma\Delta r$ and determine the number of generated lamination combinatorial data, i.e., the generated lamination combinatorial number M (Pm, Qn).

After the combinatorial trial calculation in STEP7 is carried out with respect to all the (X×Y) combinatorial conditions (Pm, Qn) (YES in STEP9), the processing means 16 compares generated lamination combinatorial numbers M (Pm, Qn) corresponding to various combinatorial conditions (Pm, Qn) with each other in STEP10 and sets a combinatorial condition (Pm, Qn) whose generated lamination combinatorial number M (Pm, Qn) is maximum as an adequate combinatorial condition (Pm0, Qn0) in STEP11, as shown in the flowchart of FIG. 4. If there are two or more combinatorial conditions (Pm, Qn) whose generated lamination combinatorial numbers M (Pm, Qn) are of the same maximum value, then a combinatorial condition (Pm, Qn) having a trial calculation starting point circumferential length parameter Pm closer to the central value of a variable range of trial calculation starting point circumferential length parameters Pm and a target clearance parameter Qn closer to the central value of a variable range of target clearance parameters Qn is preferentially set as an adequate combinatorial condition (Pm0, Qn0).

As with STEP7, combinatorial trial calculations are carried out based on the adequate combinatorial condition thus set, and lamination combinatorial data generated by the combinatorial trial calculations (lamination combinatorial data satisfying the standard requirement of the total clearance $\Sigma\Delta r$) are stored by the component data managing means 15 in STEP12.

The processing in STEP12 may be dispensed with if the generated lamination combinatorial data is stored by association with the combinatorial condition (Pm, Qn) for each of various combinatorial conditions (Pm, Qn).

The processing means 16 performs an unloaded product selecting process for selecting a pair of lamination combinatorial data corresponding to a pair of laminated rings 3a, 3b requested to be assembled, from the lamination combinatorial data corresponding to the adequate combinatorial condition (Pm0, Qn0) which has been stored as described above, in STEP13.

Figure 9:
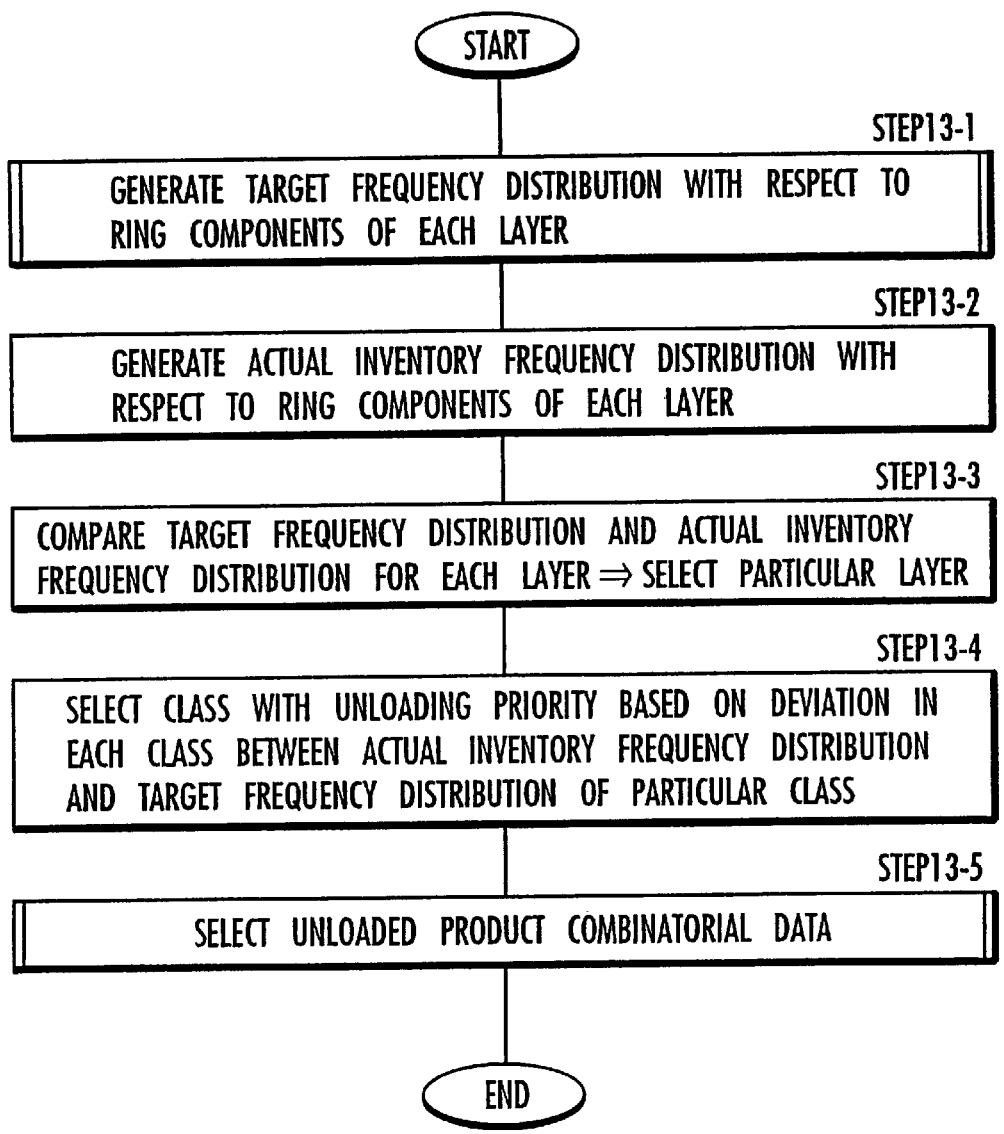
FIG. 9 is a flowchart of a subroutine of the flowchart shown in FIG. 6.
Figure 10:
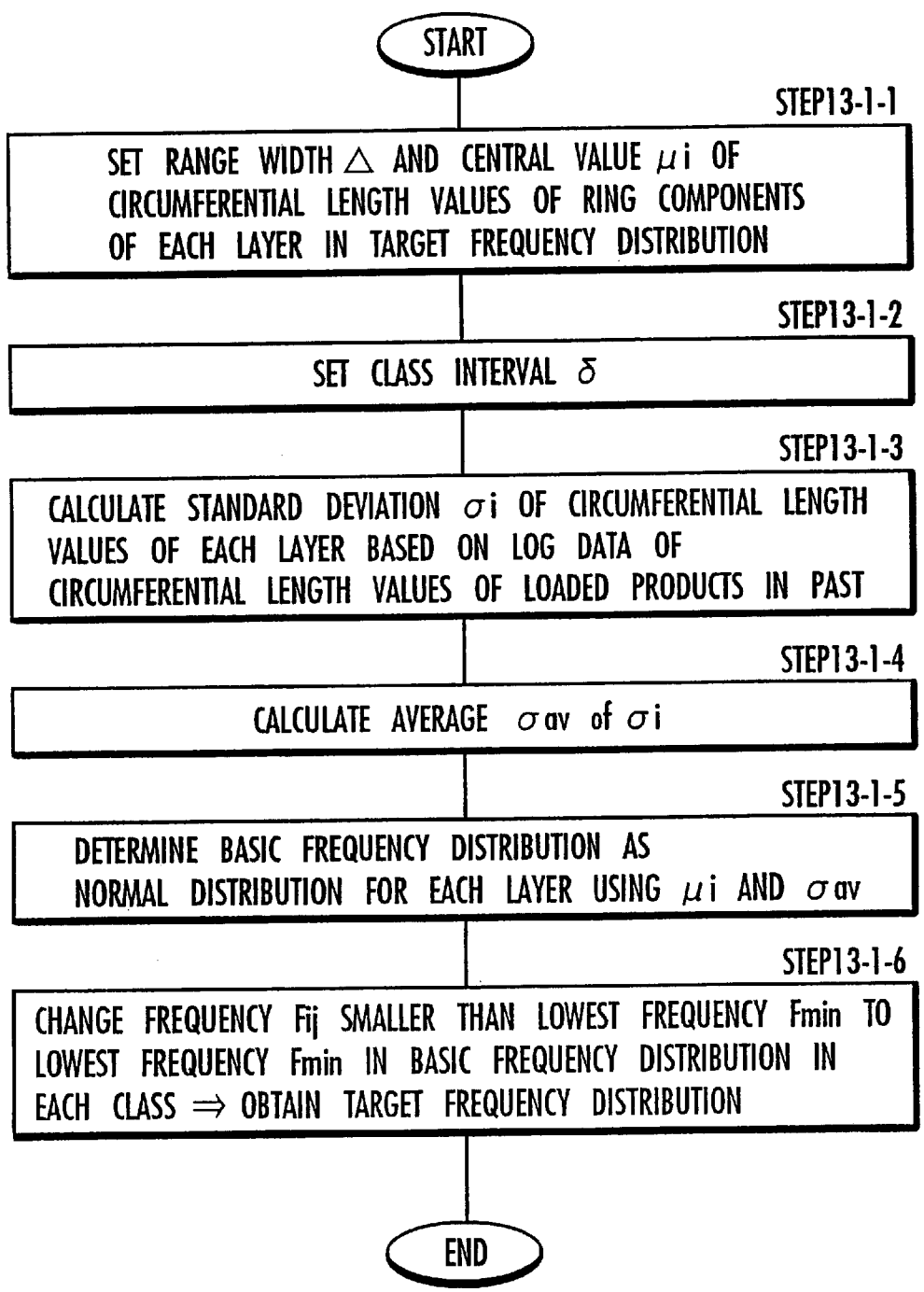
FIG. 10 is a flowchart of a subroutine of the flowchart shown in FIG. 9, FIGS. 11(*a*) and 11(*b*) are graphs showing frequency distributions generated by a processing sequence of the flowchart shown in FIG. 9, FIGS. 12(*a*), 12(*b*), and 12(*c*) are graphs showing frequency distributions generated by the processing sequence of the flowchart shown in FIG. 9.
Figure 11:
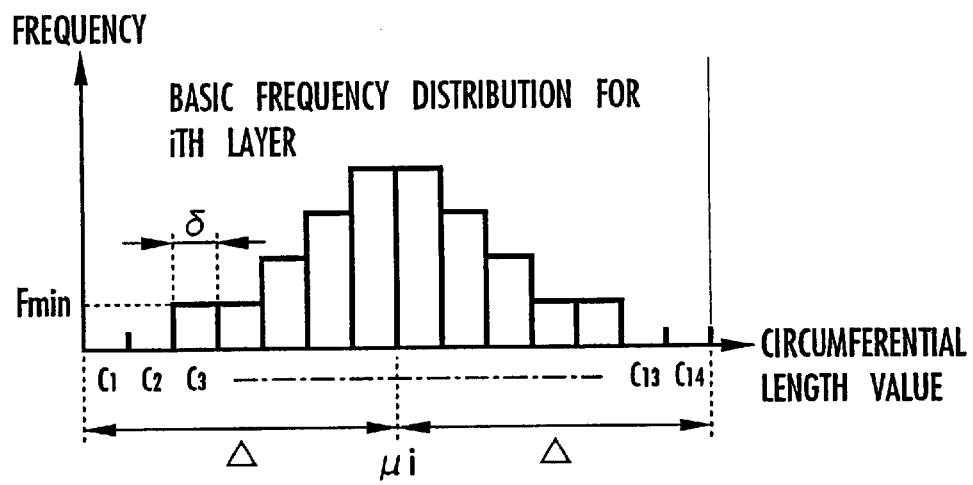
Figure 11:
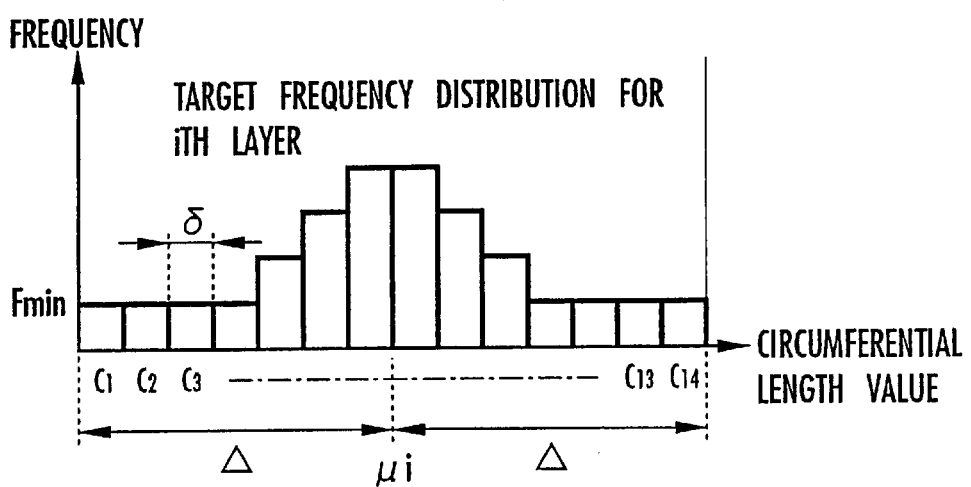
Figure 12:
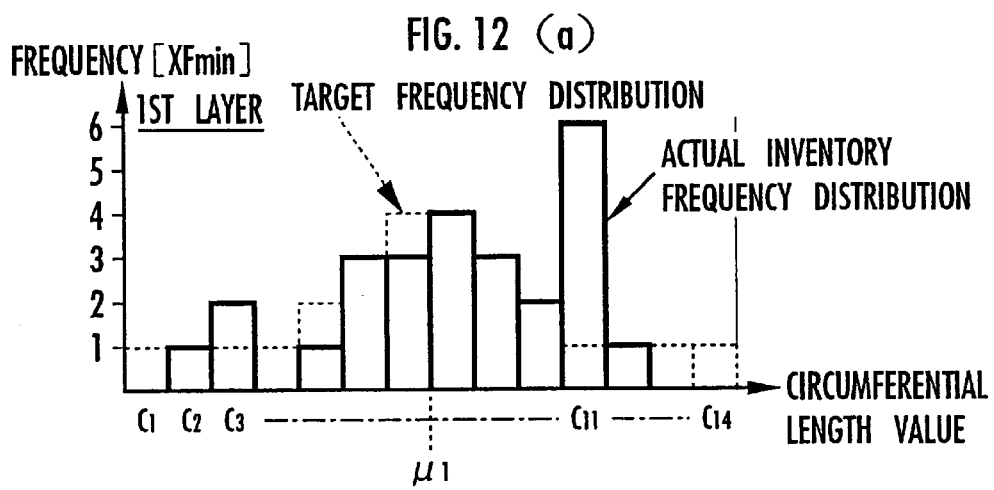
Figure 12:
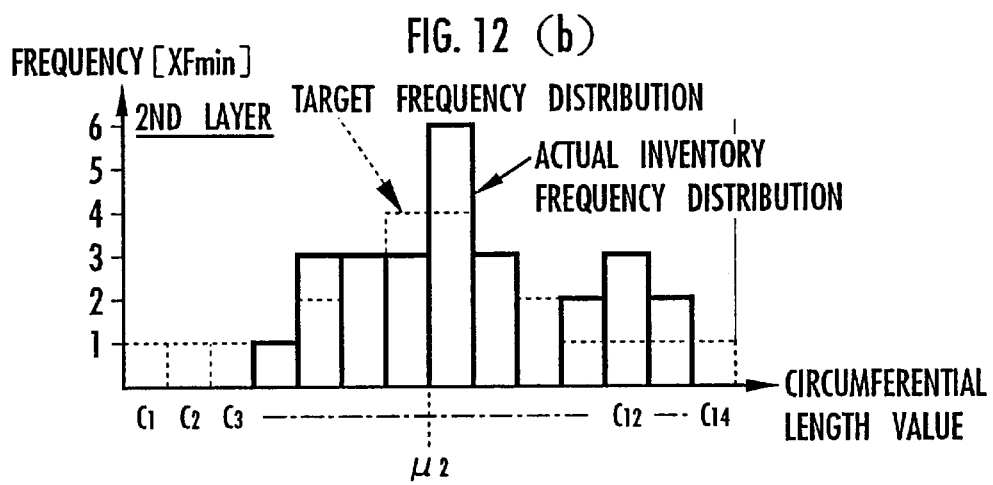
Figure 12:
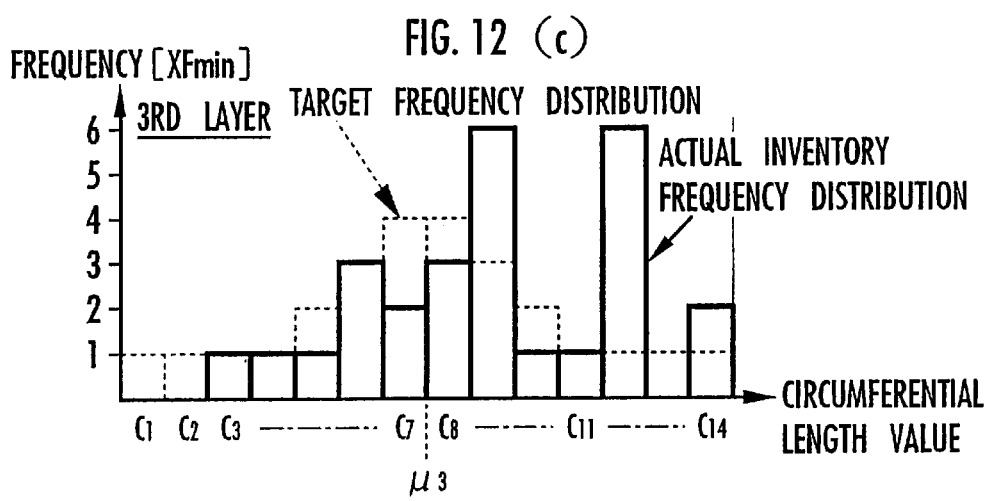
Figure 13:
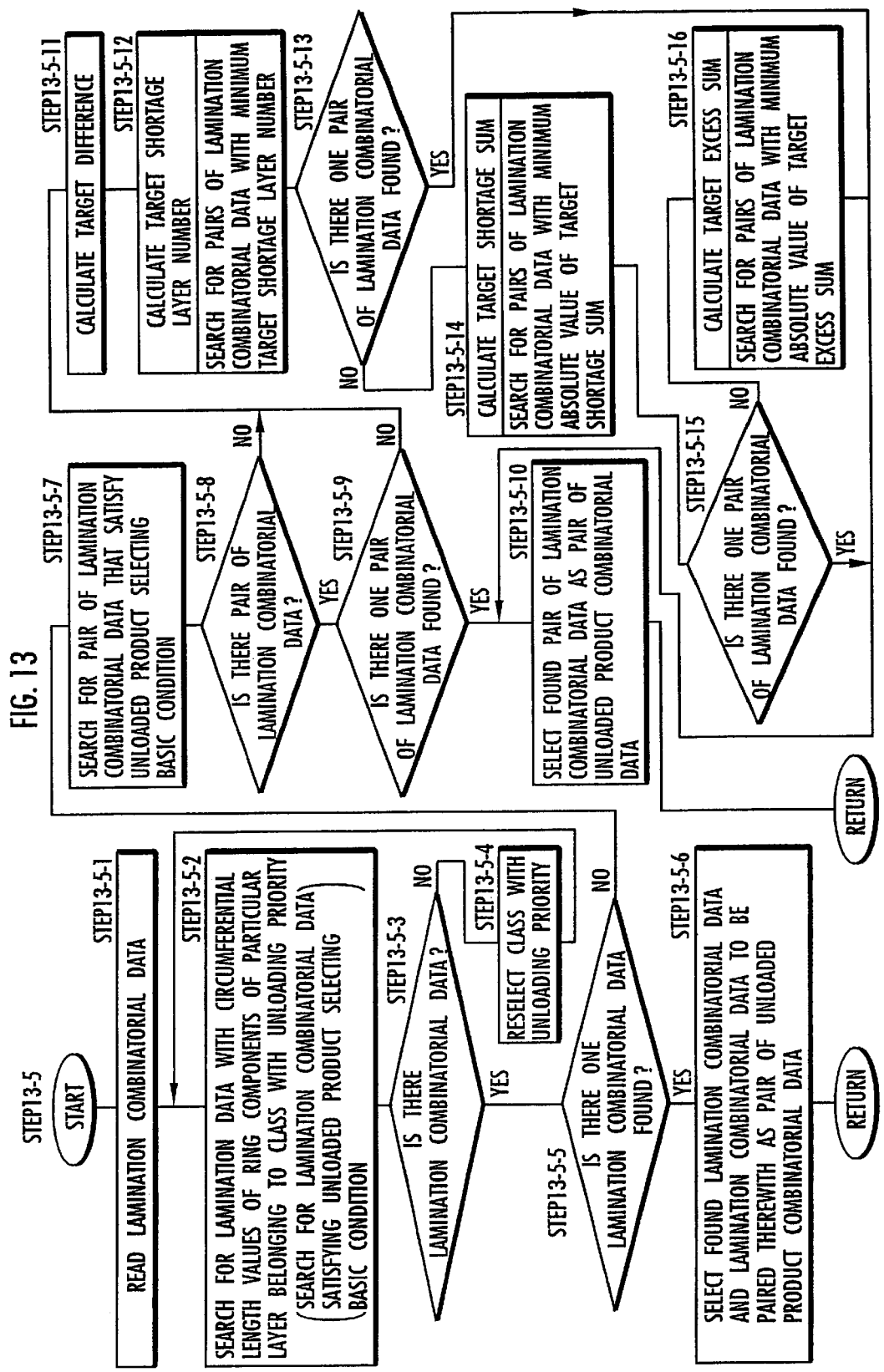
FIG. 13 is a flowchart of a subroutine of the flowchart shown in FIG. 9.

The unloaded product selecting process in STEP13 is carried out according to a flowchart shown in FIG. 9. The processing means 16 generates a target frequency distribution for the ring components 6 of the layers in the component storage facility 10 in STEP13-1. Specifically, the processing means 16 generates a target frequency distribution according to a flowchart shown in FIG. 10.

The processing means 16 sets a range width $\Delta$ (see FIGS. 11(a) and 11(b)) for circumferential length values of the ring components 4 of the layers and a central value $\mu i$ (see FIGS. 11(a) and 11(b)) of the circumferential length value of each of the ring components $4i$ (i=1, 2, . . . , N) of each of the layers in the target frequency distribution to be generated, in STEP13-1-1. The central value $\mu i$ is set to a design value of the circumferential length value of each of the ring components of each of the layers, for example. The range width Δ represents a maximum error from the central value μi of the ring components 4 of each layer (the ring components 4 of each layer that can be loaded into the component storage facility 10), which maximum error can be allowed in assembling laminated rings 3, and is set to a predetermined value which is identical for all the layers. Based on the range width Δ and the central value μi thus set, the range of circumferential length values of ring components 4i (i=1, 2, . . . , N) of each of the layers for which a target frequency distribution is generated is set as μi±Δ (i=1, 2, . . . , N) for each layer.

Then, the processing means 16 sets an interval δ (see FIGS. 11(a) and 11(b)) for each of classes in the target frequency distribution to be generated, in STEP13-1-2. The class interval δ is set to a predetermined value smaller than a standard range (allowable range) of the difference between the circumferential length values of ring components $4i$, $4_{i+1}$ of adjacent layers i, i+1, and is identical for the layers. If the numbers of ring components 4 of the layers stored in the component storage facility 10 are different from each other (in the present embodiment, the numbers of ring components 4 of the layers are identical), then the class interval δ may be adjusted depending on the maximum value of the numbers of ring components 4 of the layers. In the description that follows, the total number of classes determined by the class interval δ and the range width Δ is represented by K (=2·Δ/δ), and the classes of each of the layers are denoted by the reference characters Cj (j=1, 2, . . . , K), as shown in FIGS. 11(a) and 11(b). In the present embodiment, the total number K is K=14, for example.

Then, the processing means 16 calculates a standard deviation σi (i=1, 2, . . . , N) of the circumferential length values of each layer based on log data of the circumferential length values of the ring components 4 of each layer which have been loaded into the component storage facility 10 in the past, such as log data of the circumferential length values of the ring components 4 of each layer which have been loaded into the component storage facility 10 over a certain period in the past or log data of the circumferential length values of the ring components 4 of each layer in a certain lot which have been loaded into the component storage facility 10 in the past, the standard deviation σi being calculated as an index representative of a variation of the circumferential length values, in STEP13-1-3. The processing means 16 then calculates an average value σav (=$(σ_1+σ_2+ \ldots +σ_N)/N$, hereinafter referred to as a resultant average standard deviation (σav) of the standard deviations σi in STEP13-1-4.

The processing means 16 determines, as a basic frequency distribution (see FIG. 11(a)) for each layer, a normal frequency distribution having the central value μi (i=1, 2, . . . , N) set in STEP13-1-1 at its center and also having the resultant average standard deviation σav as a standard deviation in STEP13-1-5. If the central value of each class Cj in a layer i (i=1, 2, . . . , N) is represented by xij (j=1, 2, . . . , K) and the number of ring components 4i of each layer in the component storage facility is represented by Ri (in the present embodiment, $R_1=R_2= \ldots =R_N$), then the frequency Fij in each class Cj of the basic frequency distribution of each layer i is given by the following equation (1):

$$Fij = \frac{Ri}{\sqrt{2\pi\sigma^{av2}}} \exp\left\{-\frac{(xij - \mu i)^2}{2\sigma^{av2}}\right\} \quad (1)$$

Since the frequency Fij is of an integral value, the first figure to the right of the decimal point of a value (real number value) determined when the right side of the equation (1) is calculated is rounded off.

Then, the processing means 16 extracts classes whose frequency Fij is smaller than a predetermined minimum frequency Fmin (e.g., Fmin=2) from the frequency distribution of each layer thus determined, and sets again the frequencies of the extracted classes (the classes $C_1$, $C_2$, $C_{13}$, $C_{14}$ in FIG. 11(a)) to the minimum frequency Fmin in STEP13-1-6. In this manner, a target frequency distribution for each layer i is obtained as shown in FIG. 11(b). Since the resultant average standard deviation σav is common for each layer i, the shape (pattern) of the target frequency distribution is identical for any layers i.

Referring back to the flowchart shown in FIG. 9, after having set the target frequency distributions, the processing means 16 generates an actual frequency distribution of circumferential length values of ring components 4 of each layer i that are presently stored in the component storage facility 10, i.e., an actual inventory frequency distribution, based on the data of the circumferential length values held by the component data managing means 15 in STEP13-2. The central value μi, the range width Δ, and the class interval δ of the circumferential length values of each layer i in the actual inventory frequency distribution are the same as those in the target frequency distribution. In the following description, the frequency of each class Cj in the actual inventory frequency distribution of each layer i is represented by fij.

Then, the processing means 16 compares the target frequency distribution and the actual inventory frequency distribution with each other for each layer i, and selects one layer where the degree of agreement between the compared frequency distributions is lowest as a particular layer in STEP13-3. In the processing in STEP13-3, more specifically, the processing means 16 determines, for each layer i, the sum (=$|F_{i1}-f_{i1}|+|F_{i2}-f_{i2}|+ \ldots +|F_{iK}-f_{iK}|$) of the absolute values $|F_{ij}-f_{ij}|$ of the differences between the frequencies (target frequencies) Fij of the target frequency distributions of all classes Cj and the frequencies fij (hereinafter referred to as actual inventory frequencies fij) of the actual inventory frequency distributions of all classes Cj, as a particular layer selecting index. As the value of the particular layer selecting index is greater, the degree of agreement between the target frequency distribution and the actual inventory frequency distribution is smaller, i.e., an error is greater. The processing means 16 selects the layer i where the value of the particular layer selecting index is greatest as a particular layer (hereinafter represented by $i_0$).

For example, it is assumed that the number N of layers of a laminated ring is N=3, the actual inventory frequency distributions of the respective first through third layers are as shown in FIGS. 12(a) through 12(c), and the target frequency distributions thereof are as shown in FIG. 11(b) (indicated by the broken lines in FIGS. 12(a) through 12(c)). The particular layer selecting indexes of the respective first through third layers are 12×Fmin, 14×Fmin, and 16×Fmin, respectively. At this time, since the particular layer selecting index of the third layer is greatest, the third layer is selected as the particular layer $i_0$.

If there are a plurality of layers where the particular layer selecting index is greatest, then a layer where an error (the absolute value of a deviation) between an average value (=$(f_{i1}+f_{i2}+ \ldots +f_{iK})/K$) of the actual inventory frequencies fij of each layer and an average value (=$(F_{i1}+F_{i2}+ \ldots +F_{iK})/K$) of the target frequencies Fij of each layer is greatest is selected as the particular layer.

After having selected the particular layer $i_0$, the processing means 16 selects a class with unloading priority based on the deviation in each class Cj between the actual inventory frequency distribution and the target frequency distribution of the particular layer $i_0$ in STEP13-4. Specifically, the processing in STEP13-4 is carried out as follows: The processing means 16 determines a deviation ($f_{ioj}+F_{ioj}$) between an actual inventory frequency $f_{ioj}$ and a target frequency $F_{ioj}$ of each class Cj of the particular layer $i_0$, and determines a value ($=Wj\cdot(f_{ioj}+F_{ioj})$) which is the product of the deviation ($f_{ioj}+F_{ioj}$) and a predetermined weighting coefficient Wj (j=1, 2, . . . , K) as a class selecting index.

According to the present embodiment, the weighting coefficient Wj in each class Cj is set as shown in Table 1 below, for example. The weighting coefficients $W_7$, $W_8$ in the classes $C_7$, $C_8$ closest to the central value $\mu i$ are of the greatest value ("2" in the present embodiment), and the weighting coefficients $W_1$ through $W_6$, $W_9$ through $W_{14}$ in the other classes are of a smaller value ("1" in the present embodiment). Because the classes $C_7$, $C_8$ where the weighting coefficients are of the greatest value are closest to the central value $\mu i$, they are classes where the circumferential length values of the ring components 4 manufactured and loaded into the component storage facility 10 appear highly frequently. Therefore, the classes $C_7$, $C_8$ are classes where the actual inventory frequency is easy to increase.

the particular layer $i_0$ belong to the class with unloading priority (hereinafter referred to as an unloaded product selecting basic condition) from the lamination combinatorial data in STEP13-5-2.

Then, the processing means 16 determines whether there is lamination combinatorial data satisfying the unloaded product selecting basic condition or not in STEP13-5-3. If there is no such lamination combinatorial data, then the processing means 16 selects again a class with unloading priority of the particular layer $i_0$ in STEP13-5-4. Then, control goes back to STEP13-5-2. In STEP13-5-4, the processing means 16 selects again a class where the value of the class selecting index determined in STEP13-4 is the second greatest next to the previously selected class with unloading priority as a class with unloading priority. For example, with respect to the example shown in Table 1 above, if there is no lamination combinatorial data where the circumferential length values of the ring components of the third layer which is the particular layer belong to the class $C_{12}$, then the class $C_9$ where the value of the class selecting index is the second greatest next to the class $C_{12}$ is selected as a class with unloading priority.

If there is at least one lamination combinatorial data satisfying the unloaded product selecting basic condition in STEP13-5-3, then the processing means 16 determines whether the lamination combinatorial data searched for in STEP13-5-2 is one lamination combinatorial data or not in

TABLE 1

| No.J of Class cj | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Deviation ($f_{3j} - F_{3j}$) | -1 | -1 | 0 | 0 | -1 | 0 | -2 | -1 | 3 | -1 | 0 | 4 | -1 | 1 |
| Weighting coefficient Wj | 1 | 1 | 1 | 1 | 1 | 1 | 2 | 2 | 1 | 1 | 1 | 1 | 1 | 1 |
| Class selecting index Wj · ($f_{3j} - F_{3j}$) | -1 | -1 | 0 | 0 | -1 | 0 | -4 | -2 | 3 | -1 | 0 | 4 | -1 | 1 |

↑ Class with unloading priority

Class with Unloading Priority

In Table 1, the value of the deviation ($f_{ioj}-F_{ioj}$) is expressed on the assumption that the minimum frequency Fmin is "1".

the processing means 16 determines a class Cj where the class selecting index is of a positive maximum value as a class $Cj_0$ with unloading priority. For example, in the example shown in FIGS. 12(a) through 12(c), since the class where the class selecting index is of a positive maximum value is the class $C_{12}$, the class $C_{12}$ is selected as a class with unloading priority. If there is no class where the class selecting index is of a positive maximum value, a class closer to the central value $\mu i_0$ of the circumferential length values of the particular layer $i_0$ is selected as a class with unloading priority among the classes where the absolute value of the deviation ($f_{ioj}-F_{ioj}$) is minimum.

After having thus selected the class with unloading priority, the processing means 16 selects a pair of lamination combinatorial data (hereinafter referred to as unloaded product combinatorial data) corresponding to set ring components (4), (4) used to actually assemble a pair of laminated rings 3a, 3b, from the lamination combinatorial data determined in STEP12 (see FIG. 4) in STEP13-5. The processing in STEP13-5 is specifically carried out according to a flowchart shown in FIG. 13.

The processing means 16 reads and refers to the lamination combinatorial data that have previously determined in STEP13-5-1. The processing means 16 then searches for lamination combinatorial data satisfying a condition that the circumferential length values of the ring components 4 of STEP13-5-5. If the lamination combinatorial data searched for is one lamination combinatorial data, then this lamination combinatorial data and lamination combinatorial data paired therewith are selected as a pair of unloaded product combinatorial data corresponding to two sets of the ring components 4$_1$ through 4$_N$ of all layers for actually assembling laminated rings 3a, 3b in STEP13-5-6.

If there are a plurality of lamination combinatorial data searched for (lamination combinatorial data satisfying the unloaded product selecting basic condition) in STEP13-5-5, then the processing means 16 searches for a pair of lamination combinatorial data satisfying the unloaded product selecting basic condition with respect to both paired lamination combinatorial data (first and second lamination combinatorial data) in STEP13-5-7. Then, the processing means 16 determines whether there is a pair of lamination combinatorial data both satisfying the unloaded product selecting basic condition or not in STEP13-5-8. If there is such a pair of lamination combinatorial data, then the processing means 16 determines whether there is only one pair of such lamination combinatorial data or not in STEP13-5-9. If there is only one pair of such lamination combinatorial data satisfying the unloaded product selecting basic condition, then the processing means 16 selects the pair of such lamination combinatorial data as a pair of unloaded product combinatorial data in STEP13-5-10.

If there is no pair of lamination combinatorial data satisfying the unloaded product selecting basic condition in STEP13-5-8 or if there are a plurality of pairs of lamination combinatorial data satisfying the unloaded product selecting basic condition in STEP13-5-9, then the processing means 16 determines a deviation (=fij−Fij, hereinafter referred to as a target difference) between the actual inventory frequency fji of the class Cj to which the ring components $4i$ belong and the target frequency Fij, with respect to the ring components $4i$ of each layer except the particular layer $i_0$, which make up the lamination combinatorial data searched for in STEP13-5-2 and the lamination combinatorial data paired therewith, in STEP13-5-11. In the example shown in FIGS. 12(a) through 12(c) (the number N of layers=3, the number K of classes=14, the particular layer is the third layer, and the class with unloading priority is $C_{12}$), for instance, it is assumed that there are five kinds of lamination combinatorial data satisfying the unloaded product selecting basic condition as shown in Table 2 below. If the class of the circumferential length values of the ring components $4_1$ of the first layer which is a layer other than the particular layer (third layer) of the lamination combinatorial data ① is $C_{11}$ and the class of the circumferential length values of the ring components $4_2$ of the second layer is $C_{12}$, then the target difference=$f_{1,11}-F_{1,11}$ of the class $C_{11}$ in the first layer of the lamination combinatorial data ① and the target difference=$f_{2,12}-F_{2,12}$ of the class $C_{12}$ in the second layer of the lamination combinatorial data ① are "5", and "2", respectively, as is apparent from FIGS. 12(a) and 12(b) (the minimum frequency Fmin is "1"). The other lamination combinatorial data ② through ⑤ in Table 2 are similarly calculated. Although not shown in Table 2, target differences are similarly determined between these lamination combinatorial data ① through ⑤ and the lamination combinatorial data paired therewith.

TABLE 2

| | | 1st layer | 2nd layer | 3rd layer | Target shortage layer number | Target shortage sum | Target excess sum |
|---|---|---|---|---|---|---|---|
| Combinatorial data ① | Class No. | 11 | 12 | 12 | 0 | — | 7 |
| | Target difference | 5 | 2 | | | | |
| Combinatorial data ② | Class No. | 12 | 11 | 12 | 1 | 0 | 1 |
| | Target difference | 0 | 1 | | | | |
| Combinatorial data ③ | Class No. | 11 | 11 | 12 | 1 | 0 | 6 |
| | Target difference | | | | | | |
| Combinatorial data ④ | Class No. | 13 | 13 | 12 | | | |
| | Target difference | −1 | 1 | 1 | 1 | 1 | |
| Combinatorial data ⑤ | Class No. | 12 | 13 | 12 | 1 | 0 | 1 |
| | Target difference | 0 | 1 | | | | |

Then, the processing means 16 determines the total number of layers where the target difference is "0" or smaller as a target shortage layer number with respect to each of the lamination combinatorial data satisfying the unloaded product selecting basic condition and the lamination combinatorial data paired therewith, and searches for a pair of lamination combinatorial data where the sum of target shortage layer numbers is smallest in STEP13-5-12. For example, the target shortage layer numbers of the lamination combinatorial data ① through ⑤ are as shown in Table 2. It is assumed that the lamination combinatorial data (①, ②) are paired with each other and the lamination combinatorial data (④, ⑤) are paired with each other, and that the target shortage layer number relative to the lamination combinatorial data paired with the lamination combinatorial data ③ is "2". In this case, the sum (=0+1=1) of the target shortage layer numbers of the pair of lamination combinatorial data ①, ② is minimum. Therefore, the pair of lamination combinatorial data ①, ② is searched for in STEP13-5-12.

The processing means 16 then determines whether the pair of lamination combinatorial data searched for in STEP13-5-12 is only one pair or not in STEP13-5-13. If the pair of lamination combinatorial data searched for in STEP13-5-12 is only one pair, then the processing means 16 selects the pair of lamination combinatorial data as a pair of unloaded product combinatorial data in STEP13-5-10. For instance, in the above example described with respect to the processing in STEP13-5-12, the pair of lamination combinatorial data ①, ② is selected as a pair of unloaded product combinatorial data in STEP13-5-10.

If there are a plurality of pairs of lamination combinatorial data searched for in STEP13-5-13, then the processing means 16 determines the sum of target differences of all the layers which are "0" or smaller as a target shortage sum (≦0), with respect to each of the lamination combinatorial data of each of the pairs searched for, and searches for a pair of lamination combinatorial data where the sum of the absolute values of target shortage sums is minimum in STEP13-5-14. For instance, in the example shown in Table 2, the target shortage sums of the lamination combinatorial data ① through ⑤ are as shown in Table 2. With respect to lamination combinatorial data where there is no layer with the target difference ≦0 (e.g., the lamination combinatorial data ①, ③), no target shortage sum is determined.

It is assumed that, in Table 2, the lamination combinatorial data (①, ②) are paired with each other and the lamination combinatorial data (③, ④) are paired with each other, and that the target shortage sum relative to the lamination combinatorial data paired with the lamination combinatorial data ⑤ is "0". In this case, the sum (=−1) of the target shortage sums of the pair of lamination combinatorial data ③, ④ is minimum. Therefore, the pair of lamination combinatorial data ③, ④ is searched for in STEP13-5-14.

The processing means 16 then determines whether the pair of lamination combinatorial data searched for in STEP13-5-14 is only one pair or not in STEP13-5-15. If the pair of lamination combinatorial data searched for in STEP13-5-14 is only one pair, then the processing means 16 selects the pair of lamination combinatorial data searched for as a pair of unloaded product combinatorial data in STEP13-5-10. For instance, in the above example described with respect to the processing in STEP13-5-14, the pair of lamination combinatorial data ③, ④ is selected as a pair of unloaded product combinatorial data in STEP13-5-10.

If there are a plurality of pairs of lamination combinatorial data searched for in STEP13-5-15, then the processing means 16 determines the sum of target differences of all the layers which are "1" or greater as a target excess sum (>0), with respect to each of the lamination combinatorial data of each of the pairs searched for, and searches for a pair of lamination combinatorial data where the sum of the absolute values of target excess sums is maximum in STEP13-5-16.

For instance, in the example shown in Table 2, the target excess sums of the lamination combinatorial data ① through ⑤ are as shown in Table 2. If either of target excess sums relative to the lamination combinatorial data paired with the lamination combinatorial data ① through ⑤ in Table 2 is "1", then the lamination combinatorial data ① and the lamination combinatorial data paired therewith are searched for in STEP13-5-16.

Then, the processing means 16 selects the pair of lamination combinatorial data searched for in STEP13-5-16 as a pair of unloaded product combinatorial data in STEP13-5-10. For instance, in the above example described with respect to the processing in STEP13-5-16, the lamination combinatorial data ① and the lamination combinatorial data paired therewith are selected as a pair of unloaded product combinatorial data in STEP13-5-10. If there are a plurality of pairs of lamination combinatorial data searched for in STEP13-5-16, then the processing means 16 selects one of those pairs of lamination combinatorial data where the sum, for all the layers, of the differences between the circumference length values of ring components $4i$, $4_{i+1}$ ($i=1$, 2, . . . , N-1) adjacent to each other is closest to a predetermined standard value, as a pair of unloaded product combinatorial data.

Referring back to the flowchart shown in FIG. 4, after having selected unloaded product combinatorial data, the computer 13 performs a process of unloading ring components $4_1$–$4_N$ that make up the pair of lamination combinatorial data selected as the pair of unloaded product combinatorial data in STEP14. Specifically, the computer 13 instructs the unloading device 12 to remove ring components $4_1$–$4_N$ (set ring components (4)) of all layers that make up the selected pair of unloaded product combinatorial data from the component storage facility 10 and supply the removed ring components $4_1$–$4_N$ to the laminating device 14. The unloading device 12 thus instructed removes set ring components (4) corresponding to the instructed unloaded product combinatorial data from the component storage facility 10, and supplies the removed set ring components (4) to the laminating device 14.

The process described above is repeatedly carried out by the computer 13 each time there is a request to unload set ring components (4).

In the present embodiment, as described above, combinatorial trial calculations are performed based on the respective plural (X×Y) combinatorial conditions, and a combinatorial condition for maximizing the generated lamination combinatorial number M (Pm, Qn) is obtained as an adequate combinatorial condition (Pm0, Qn0). In this manner, a combinatorial condition is found which is capable of assembling as many laminated rings 3 as possible from the ring components 4 stored by the component storage facility 10.

A pair of lamination combinatorial data is selected from the lamination combinatorial data that are generated based on the adequate combinatorial condition (Pm0, Qn0). Set ring components (4) corresponding to two lamination combinatorial data included in each of the selected pair of lamination combinatorial data are actually unloaded from the component storage facility 10, supplied to the laminating device 14, and assembled into laminated rings 3. Therefore, many pairs of ring components (4) can be supplied from the component storage facility 10 to the laminating device 14 to assemble laminated rings 3.

Consequently, the mass-productivity of laminated rings 3 can be increased, and ring components 4 manufactured and loaded into the component storage facility 10 can be used efficiently (with a good yield) to assemble laminated rings 3.

In the present embodiment, each time set ring components (4) to assemble a laminated ring 3 are unloaded, a layer where the value of the particular layer selecting index representing an error of the actual inventory frequency distribution with respect to the target frequency distribution is regarded as a particular layer $i_0$, and a class where the value of the class selecting index basically representing the degree by which the actual inventory frequency $f_{i0j}$ is greater than the target frequency $F_{i0j}$ is greater is selected as a class with unloading priority from all classes Cj of the particular layer $i_0$. The class selecting index is of a value produced when the deviation ($f_{i0j}$–$F_{i0j}$) between the actual inventory frequency $f_{i0j}$ and the target frequency $F_{i0j}$ is corrected by being multiplied by the weighting coefficient Wj. The weighting coefficient Wj is set to a greater value for a class which is loaded into the component storage facility 10 at a higher frequency and has the actual inventory frequency $f_{i0j}$ which is easier to increase. Therefore, if the deviation ($f_{i0j}$–$F_{i0j}$) is the same, then a class having the actual inventory frequency $f_{i0j}$ which is easier to increase is selected more preferentially as a class with unloading priority. A pair of lamination combinatorial data including the ring components 4 which belong to the selected class with unloading priority in at least one of the lamination combinatorial data is selected as a pair of unloaded product combinatorial data, and set ring components (4) corresponding to the unloaded product combinatorial data are unloaded as components to assemble a laminated ring 3 from the component storage facility 10.

As the above unloading process is repeated, the actual inventory frequency distribution of each layer approaches the target frequency distribution reliably and smoothly until finally the actual inventory frequency distribution is substantially kept equal to the target frequency distribution. The target frequency distribution is of an identical pattern (normal distribution pattern) for layers, and maintains a frequency equal to or higher than the minimum frequency Fmin in all classes allowed for the circumferential length values of the ring components of each of the layers. Therefore, the actual inventory frequency distribution finally becomes a distribution capable of continuously and stably assembling more laminated rings from the ring components 4 stored in the component storage facility 10, and also becomes a distribution which does not leave ring components 4 continuously unassembled. As a consequence, laminated rings 3 can stably and continuously be mass-produced with a good yield.

The target frequency distribution is set to a normal distribution pattern having a variation equivalent to the variation of the circumferential length values of the ring components 10 that have actually been loaded in the past into the component storage facility 10. That is, the target frequency distribution is set to a distribution which can easily be sued as an actual inventory frequency distribution. Therefore, the actual inventory frequency distribution can quickly be brought closely to the target frequency distribution, increasing the continuous stability of mass production of laminated rings 3.

If there are a plurality of lamination combinatorial data (lamination combinatorial data satisfying the unloaded product selecting basic condition) including ring components 4 which belong to the selected class of unloading priority, then a pair of lamination combinatorial data which both include ring components belonging to the class with unloading priority is selected as a pair of unloaded product combinatorial data. Therefore, the ability to quickly bring the actual inventory frequency distribution closely to the target frequency distribution is increased.

If there are a plurality of pairs of lamination combinatorial data including ring components 4 where both paired lamination combinatorial data belong to the class with unloading priority, or if there are a plurality of pairs of lamination combinatorial data including ring components 4 where one of paired lamination combinatorial data belongs to the class with unloading priority, then a pair of lamination combinatorial data where the sum of target shortage layer numbers (the sum of layers with the target difference being equal to or less than "0") is minimum is selected preferentially as a pair of unloaded product combinatorial data. Then, a pair of lamination combinatorial data where the sum of the absolute values of target shortage sums (the sum of target differences of all layers with the target difference being equal to or less than "0") is minimum is selected preferentially as a pair of unloaded product combinatorial data. That is, among pairs of lamination combinatorial data where at least one of the lamination combinatorial data satisfies the unloaded product selecting basic condition, a pair of lamination combinatorial data including lamination combinatorial data having more layers where the actual inventory frequency is smaller than the target frequency and lamination combinatorial data having layers where the degree by which the actual inventory frequency is smaller than the target frequency is relatively high, is not positively selected as a pair of unloaded product combinatorial data, but a pair of lamination combinatorial data other than such a pair of lamination combinatorial data is selected as a pair of unloaded product combinatorial data.

It is thus possible to prevent the actual inventory frequency distribution from becoming a distribution state in which the actual inventory frequency distribution has a valley (recess) with respect to the target frequency distribution. If the actual inventory frequency distribution becomes a distribution state having a valley, then the total number of pairs of lamination combinatorial data obtained with respect to the ring components 4 in the component storage facility 10 (the number of pairs of laminated rings 3a, 3b that can be assembled) tends to drop sharply. However, such a tendency is prevented from occurring.

In the present embodiment, a pair of lamination combinatorial data corresponding to a pair of laminated rings 3a, 3b is generated by combinatorial trial calculations in view of the standard requirement of the first layer circumferential length difference ΔL1. However, in combinatorial trial calculations, lamination combinatorial data may be generated based on only the trial calculation starting point selecting condition and the interlayer selecting condition without taking into account the standard requirement of the first layer circumferential length difference ΔL1. In this case, after unloaded product combinatorial data are selected and laminated rings 3 are assembled, a pair of laminated rings 3 may be combined and a CVT belt may be assembled. In this case, unloaded product combinatorial data are selected as follows: Lamination combinatorial data satisfying the unloaded product selecting basic condition is selected preferentially as unloaded product combinatorial data. If there are a plurality of lamination combinatorial data satisfying the unloaded product selecting basic condition, unloaded product combinatorial data are selected in the same manner as with the first embodiment described above, taking into account the target shortage layer number, the target shortage sum, and the target excess sum successively.

In the first embodiment described above, set ring components (4) corresponding lamination combinatorial data are unloaded pair by pair to assemble laminated rings 3a, 3b. However, a plurality of pairs of lamination combinatorial data may be selected from lamination combinatorial data based on the adequate combinatorial condition (Pm, Qn), and a plurality of pairs of set ring components (4), (4) corresponding to the selected pairs of lamination combinatorial data may be unloaded to assemble laminated rings 3a, 3b.

A second embodiment of the present invention will be described below with reference to FIG. 14. The second embodiment is an embodiment relative to a second aspect of the present invention. The present embodiment differs from the first embodiment only as to the processing in STEP13 (unloaded product selecting process) shown in FIG. 4 according to the first embodiment. Those structural details and processing details according to the second embodiment which are identical to those of the first embodiment are denoted by identical reference characters in identical figures, and will not be described in detail below.

According to the present embodiment, in the unloaded product selecting process in STEP13 shown in FIG. 4, as many pairs of lamination combinatorial data as the number of pairs of laminated rings 3a, 3b required to be assembled (hereinafter referred to as the number of products required to be unloaded) are selected, and the total number of selected lamination combinatorial data is twice the number of products required to be unloaded.

The unloaded product selecting process is carried out according to a flowchart shown in FIG. 14.

The processing means 16 of the computer 13 calculates and stores an average value $\mu_{i1}$ (i=1, 2, ..., N), for each layer, of the circumferential length values of all the ring components 4 presently stored in the component storage facility 10 in STEP13-11. The average value $\mu_{i1}$ serves as an index representing a frequency distribution (corresponding to a target frequency distribution according to the second aspect of the present invention), for each layer, of the circumferential length values of all the ring components 4 presently stored in the component storage facility 10.

Then, the processing means 16 selects one pair of lamination combinatorial data (hereinafter referred to as a lamination combinatorial data pair) from the lamination combinatorial data generated by the combinatorial trial calculations in STEP12 shown in FIG. 4 (combinatorial trial calculations based on the adequate combinatorial condition (Pm0, Qn0) in STEP13-12.

The processing in STEP13-12 is repeated in as many times as the total number of lamination combinatorial data pairs included in the combinatorial trial calculations in STEP12. Each time the processing is repeated, a new lamination combinatorial data pair is selected. Two lamination combinatorial data of a new lamination combinatorial data pair selected in STEP13-12 correspond to hypothetical unloading combinatorial data in the second aspect of the present invention.

Then, the processing means 16 calculates an average value $\mu_{i2}$ (i=1, 2, ..., N), for each layer, of the circumferential length values of the remaining component data except those component data included in the pair of lamination combinatorial data selected in STEP13-12, held by the component data managing means 15 (the component data relative to all the ring components 4 presently stored in the component storage facility 10) in STEP13-13.

Then, the processing means 16 calculates the absolute value $\Delta\mu i = |\mu_{i2} - \mu_{i}1|$ (i=1, 2, ..., N, hereinafter referred to as a layer-dependent circumferential length deviation $\Delta\mu i$) of the deviation between the average value $\mu_{i1}$ (i=1, 2, ..., N), for each layer, of the circumferential length values calculated in STEP13-11, i.e., the average value $\mu_{i1}$, for each layer, of the circumferential length values of the ring components 4 presently stored in the component storage facility 10, and the average value $\mu_{i2}$ determined in STEP13-13 in STEP13-14.

In STEP13-14, the processing means 16 also calculates a standard deviation $\sigma a=\sqrt{(\Delta\mu_{12}+\Delta\mu_{22}+\ldots\Delta\mu_{N2})}$ representing the variation of the layer-dependent circumferential length deviation $\Delta\mu i$ (i=1, 2, ..., N).

The layer-dependent circumferential length deviation $\Delta\mu i$ (i=1, 2, ..., N) and the standard deviation $\sigma a$ which are calculated in STEP13-14 are stored in association with the pair of lamination combinatorial data selected in STEP13-12.

Then, the processing means 16 determines whether all pairs of lamination combinatorial data of the lamination combinatorial data generated in STEP12 have been selected or not in STEP13-15. If there are any unselected pairs of lamination combinatorial data, then the processing means 16 selects a new pair of lamination combinatorial data in STEP13-12, and then repeats the processing in STEP13-13 and STEP13-14.

Therefore, each time a pair of lamination combinatorial data is selected in STEP13-12, the layer-dependent circumferential length deviation $\Delta\mu i$ (i=1, 2, ..., N) and the standard deviation $\sigma a$ are calculated in association with the selected pair of lamination combinatorial data with respect to the remaining component data except those component data included in the pair of lamination combinatorial data. That is, if a pair of set ring components (4) corresponding to the pair of lamination combinatorial data selected in STEP13-12 is hypothetically unloaded from the component storage facility 10, it is observed how the average value of the circumferential length values of the ring components 4 of each layer (which means an index representing a frequency distribution of the circumferential length values of each layer) in the component storage facility 10 changes from the state prior to the hypothetical unloading, and how the standard deviation $\sigma a$ representing the variation of the change between the layers subsequent to the hypothetical unloading.

If it is confirmed in STEP13-15 that all pairs of lamination combinatorial data are selected in STEP13-12, then the processing means 16 selects as many pairs of lamination combinatorial data as the number of products required to be unloaded based on the unloaded product selecting requirement read in STEP1, from the lamination combinatorial data generated in STEP12 in STEP13-16.

More specifically, in the present embodiment, the unloaded product selecting requirement is determined such that a pair of lamination combinatorial data for making smaller both the sum $\Sigma\Delta\mu i$ ($\Delta\mu_1+\Delta\mu_2+\ldots+\Delta\mu_N$), for all layers, of layer-dependent circumferential length deviations $\Delta\mu i$ (i=1, 2, ..., N) and the standard deviation $\sigma a$ is selected preferentially as a pair of set ring components (4) to be used to actually assemble a laminated ring 3.

In STEP13-16, the processing means 16 selects as many pairs of lamination combinatorial data as the number of products required to be unloaded according to the unloaded product selecting requirement thus determined. Then, control returns to the routine shown in FIG. 4.

If there are a plurality of pairs of lamination combinatorial data where $\Sigma\Delta\mu i$ and $\sigma a$ are identical in STEP13-16, then a pair of lamination combinatorial data is selected taking into account the value of the total clearance $\Sigma\Delta r$ of two lamination combinatorial data included in the pair of lamination combinatorial data and the variation of the inter-ring clearance $\Delta r$.

According to the above unloaded product selecting process in STEP13, a pair of lamination combinatorial data corresponding to a pair of set ring components (4) is selected which minimizes the change (layer-dependent circumferential length deviation $\Delta\mu i$) of the average value $\mu_{i2}$, for each layer, of the circumferential length values of the ring components 4 after being unloaded from the average value $\mu_{i1}$, for each layer, of the circumferential length values of the ring components 4 before being unloaded, and which also minimizes the variation of the change between the layers. Stated otherwise, a pair of lamination combinatorial data is selected such that the frequency distribution, for each layer, of the circumferential length values of the ring components 4 after being unloaded is in agreement with the frequency distribution, for each layer, of the circumferential length values of the ring components 4 before being unloaded as much as possible and the change of the frequency distribution from the frequency distribution before being loaded does not greatly vary between the layers. The other processing details in STEP13 than described above are identical to those according to the first embodiment.

In the present embodiment, for selecting as many pairs of lamination combinatorial data as the number of products required to be unloaded from the lamination combinatorial data generated based on the adequate combinatorial condition (Pm0, Qn0), as described above, a pair of lamination combinatorial data is selected such that the frequency distribution, for each layer, of the circumferential length values of the ring components 4 after being unloaded from the component storage facility 10 is in agreement with the frequency distribution, for each layer, of the circumferential length values of the ring components 4 before being unloaded as much as possible and the change of the frequency distribution from the frequency distribution before being loaded does not greatly vary between the layers. That is, a pair of lamination combinatorial data is selected which is capable of achieving the frequency distribution, for each layer, of the circumferential length values of the ring components 4 before being unloaded as much as possible. Since many ring components 4 loaded into the component storage facility 10 basically have their circumferential length values concentrating in the vicinity of design values therefor, when ring components 4 are repeatedly loaded into and unloaded from the component storage facility 10, the circumferential length values of the ring components 4 of each layer in the component storage facility 10 before being unloaded basically have a frequency distribution centered around a value in the vicinity of the design values.

Consequently, the frequency distribution of the circumferential length values of the ring components 4 of each layer in the component storage facility 10 can continuously be maintained in a state capable of generating more lamination combinatorial data, and hence laminated rings 3 can be mass-produced continuously stably.

As with the first embodiment, a combinatorial condition for maximizing the generated lamination combinatorial number M (Pm, Qn) is used as an adequate combinatorial condition (Pm0, Qn0). As many pairs of lamination combinatorial data as the number of products required to be unloaded are selected from the lamination combinatorial data generated under the adequate combinatorial condition (Pm0, Qn0) as pairs of lamination combinatorial data corresponding to pairs of laminated rings 3a, 3b. Therefore, the mass-productivity of laminated rings 3 can be increased, and ring components 4 manufactured and loaded into the component storage facility 10 can be used efficiently (with a good yield) to assemble laminated rings 3.

A third embodiment of the present invention will be described below with reference to FIG. 15. The third embodiment is an embodiment relative to the second aspect of the present invention. The present embodiment differs from the first embodiment only as to the processing in STEP13 (unloaded product selecting process) shown in FIG. 4 according to the first embodiment. Those structural details and processing details according to the third embodiment which are identical to those of the first embodiment are denoted by identical reference characters in identical figures, and will not be described in detail below.

In the present embodiment, the processing in STEP13 (unloaded product selecting process) shown in FIG. 4 is carried out by the processing means 16 of the computer 13 according to a flowchart shown in FIG. 15.

The processing means 16 calculates an average value $\mu$ix (i=1, 2, ..., N) of the circumferential length values of ring components for each layer and a standard deviation σix (i=1, 2, ..., N) of the circumferential length values of each layer based on log data of the circumferential length values of the ring components 4 of each layer which have been loaded into the component storage facility 10 in the past in STEP13-21.

The log data include load data of the circumferential length values of the ring components 4 of each layer which have been loaded into the component storage facility 10 over a certain period in the past (a period of time from the present to a certain time) and log data of the circumferential length values of the ring components 4 of each layer in a certain lot which have been loaded into the component storage facility 10 in the past. The average value $\mu$ix and the standard deviation σix serve as an index representing the frequency distribution of the circumferential length values of each other in the log data.

Then, the processing means 16 selects one pair of lamination combinatorial data from the lamination combinatorial data generated by the combinatorial trial calculations in STEP12 shown in FIG. 4 (combinatorial trial calculations based on the adequate combinatorial condition (Pm0, Qn0) in STEP13-22. The selecting process is carried out in exactly the same manner as with the processing in STEP13-12 according to the second embodiment.

Then, the processing means 16 calculates an average value $\mu$iy (i=1, 2, ..., N) and a standard deviation σiy (i=1, 2, ..., N), for each layer, of the circumferential length values of the remaining component data except those component data included in the pair of lamination combinatorial data selected in STEP13-22, held by the component data managing means 15 (the component data relative to all the ring components 4 presently stored in the component storage facility 10) in STEP13-23.

Then, the processing means 16 calculates the absolute value $\Delta\mu i'=|\mu ix-\mu iy|$ (i=1, 2, ..., N, hereinafter referred to as a layer-dependent circumferential length deviation $\Delta\mu i'$) of the deviation between the average value $\mu$ix (i=1, 2, ..., N), for each layer, of the circumferential length values calculated in STEP13-21, i.e., the average value $\mu$ix, for each layer, of the circumferential length values of the ring components 4 stored in the component storage facility 10 in the past, and the average value $\mu$iy determined in STEP13-23 in STEP13-24.

In STEP13-24, the processing means 16 also calculates the absolute value $\Delta\sigma i=|\sigma ix-\sigma iy|$ (i=1, 2, ..., N, hereinafter referred to as a layer-dependent standard deviation change $\Delta\sigma i$), for each layer, of the deviation between the standard deviation σix (i=1, 2, ..., N) of the circumferential length values, for each layer, previously calculated in STEP13-21 and the standard deviation σiy determined in STEP13-23. In STEP13-24, the processing means 16 also calculates a standard deviation $\sigma b=\sqrt{(\Delta\sigma_1^2+\Delta\sigma_2^2+\ldots\Delta\sigma_N^2)}$ representing the variation of the layer-dependent standard deviation change $\Delta\sigma i$ (i=1, 2, ..., N).

The layer-dependent circumferential length deviation $\Delta\mu i'$ (i=1, 2, ..., N), the layer-dependent standard deviation change $\Delta\sigma i$, and the standard deviation σb are stored in association with the pair of lamination combinatorial data selected in STEP13-22.

Then, the processing means 16 determines whether all pairs of lamination combinatorial data of the lamination combinatorial data generated in STEP12 (see FIG. 4) have been selected or not in STEP13-25. If there are any unselected pairs of lamination combinatorial data, then the processing means 16 selects a new pair of lamination combinatorial data in STEP13-22, and then repeats the processing in STEP13-23 and STEP13-24.

Therefore, each time a pair of lamination combinatorial data is selected in STEP13-22, layer-dependent circumferential length deviation $\Delta\mu i'$ (i=1, 2, ..., N), the layer-dependent standard deviation change $\Delta\sigma i$ (i=1, 2, ..., N), and the standard deviation σb of the layer-dependent standard deviation change $\Delta\sigma i$ are calculated in association with the selected pair of lamination combinatorial data with respect to the remaining component data except those component data included in the pair of lamination combinatorial data. That is, if a pair of set ring components (4) corresponding to the pair of lamination combinatorial data selected in STEP13-22 is hypothetically unloaded from the component storage facility 10, it is observed how the average value and standard deviation of the circumferential length values of the ring components 4 of each layer (which means an index representing a frequency distribution of the circumferential length values of each layer, including a graphic representation) in the component storage facility 10 changes from the state prior to the hypothetical unloading, and how the standard deviation σb representing the variation of the change (change of the graphic representation of the frequency distribution) between the layers subsequent to the hypothetical unloading.

If it is confirmed in STEP13-25 that all pairs of lamination combinatorial data are selected in STEP13-22, then the processing means 16 selects as many pairs of lamination combinatorial data as the number of products required to be unloaded based on the unloaded product selecting requirement read in STEP1, from the lamination combinatorial data generated in STEP12 in STEP13-26.

More specifically, in the present embodiment, the unloaded product selecting requirement is determined such that a pair of lamination combinatorial data for making smaller the sum $\Sigma\Delta\mu i'$ ($\Delta\mu_1'+\Delta\mu_2'+\ldots+\Delta\mu_N'$), for all layers, of layer-dependent circumferential length deviations $\Delta\mu i'$ (i=1, 2, ..., N), the sum $\Sigma\Delta\sigma i$ (=$\Delta\sigma_1+\Delta\sigma_2+\ldots+\Delta\sigma_N$), for all layers of layer-dependent standard deviation changes $\Delta\sigma i$, and the standard deviation σb is selected preferentially as a pair of set ring components (4) to be used to actually assemble a laminated ring 3.

In STEP13-26, the processing means 16 selects as many pairs of lamination combinatorial data as the number of products required to be unloaded according to the unloaded product selecting requirement thus determined. Then, control returns to the routine shown in FIG. 4.

If there are a plurality of pairs of lamination combinatorial data where $\Sigma\Delta\mu i'$, $\Sigma\Delta\sigma i$, and σb are identical in STEP13-26, then a pair of lamination combinatorial data is selected taking into account the value of the total clearance $\Sigma\Delta r$ of two lamination combinatorial data included in the pair of lamination combinatorial data and the variation of the inter-ring clearance Δr.

According to the above unloaded product selecting process in STEP13, a pair of lamination combinatorial data corresponding to a pair of set ring components (4) is selected which minimizes the change (layer-dependent circumferential length deviation $\Delta\mu i'$ and layer-dependent standard deviation change $\Delta\sigma i$) of the average value $\mu iy$ and the standard deviation $\sigma iy$, for each layer, of the circumferential length values of the ring components 4 after being unloaded from the average value $\mu ix$ and the standard deviation $\sigma ix$, for each layer, of the circumferential length values in the log data of the ring components 4 which have been loaded in the past, and which also minimizes the variation of the change of the layer-dependent standard deviation change $\Delta\sigma i$ between the layers. Stated otherwise, a pair of lamination combinatorial data is selected such that the frequency distribution, for each layer, of the circumferential length values of the ring components 4 after being unloaded is in agreement with the frequency distribution including its graphical representation, for each layer, of the circumferential length values of the ring components 4 which have been loaded in the past as much as possible and the change of the frequency distribution does not greatly vary between the layers. The other processing details in STEP13 than described above are identical to those according to the first embodiment.

In the present embodiment, for selecting as many pairs of lamination combinatorial data as the number of products required to be unloaded from the lamination combinatorial data generated based on the adequate combinatorial condition (Pm0, Qn0), as described above, a pair of lamination combinatorial data is selected such that the frequency distribution, for each layer, of the circumferential length values of the ring components 4 after being unloaded from the component storage facility 10 is in agreement with the frequency distribution including its graphical representation, for each layer, of the circumferential length values of the ring components 4 before being unloaded as much as possible and the change of the frequency distribution does not greatly vary between the layers. That is, a pair of lamination combinatorial data is preferentially selected which is capable of bringing the frequency distribution, for each layer, of the circumferential length values of the ring components 4 after being unloaded from the component storage facility 10 into agreement with the frequency distribution, for each layer, of the circumferential length values of the ring components 4 which has been loaded in the past as much as possible.

Consequently, as with the second embodiment, the frequency distribution of the circumferential length values of the ring components 4 of each layer in the component storage facility 10 can continuously be maintained in a state capable of generating more lamination combinatorial data, and hence laminated rings 3 can be mass-produced continuously stably. Particularly, according to the present embodiment, in order to observe a frequency distribution of the circumferential length values of the ring components 4 of each layer, not only the average value of circumferential length values, but also the standard deviation showing a graphical representation of the frequency distribution (the standard deviation of the circumferential length values), are employed. Therefore, the frequency distribution of the circumferential length values of the ring components 4 of each layer in the component storage facility 10 can better be controlled in the unloaded product selecting process, and hence laminated rings 3 can be mass-produced continuously stably.

According to the third embodiment, as with the first and second embodiments, set ring components (4) corresponding to two lamination combinatorial data included in a pair of lamination combinatorial data selected from the lamination combinatorial data generated under the adequate combinatorial condition (Pm0, Qn0) are actually unloaded from the component storage facility 10 and supplied to the laminating device 14, which assembles a laminated ring 3. Therefore, more pairs of set ring components (4) can be supplied from the component storage facility 10 to the laminating device 14 to assemble laminated rings 3. The mass-productivity of laminated rings 3 can be increased, and ring components 4 manufactured and loaded into the component storage facility 10 can be used efficiently (with a good yield) to assemble laminated rings 3.

In the present embodiment, the layer-dependent circumferential length deviation $\Delta\mu i'$, the layer-dependent standard deviation change $\Delta\sigma i$, and the standard deviation $\sigma b$ of the layer-dependent standard deviation change $\Delta\sigma i$ are employed in order to observe a change in the frequency distribution of the circumferential length values of the ring components 4 of each layer. However, as with the second embodiment, the layer-dependent circumferential length deviation $\Delta\mu i'$ and its standard deviation $\sigma a$ may be employed. Conversely, in the second embodiment, the layer-dependent circumferential length deviation $\Delta\mu i'$, the layer-dependent standard deviation change $\Delta\sigma i$, and the standard deviation $\sigma b$ of the layer-dependent standard deviation change $\Delta\sigma i$ may be employed in order to observe a change in the frequency distribution of the circumferential length values of the ring components 4 of each layer.

A fourth embodiment of the present invention will be described below with reference to FIG. 16. The fourth embodiment is an embodiment relative to the third aspect of the present invention. The present embodiment differs from the first embodiment only as to the processing in STEP13 (unloaded product selecting process) shown in FIG. 4 according to the first embodiment. Those structural details and processing details according to the fourth embodiment which are identical to those of the first embodiment are denoted by identical reference characters in identical figures, and will not be described in detail below. In the present embodiment, the processing means 16 of the computer 13 has the functions of the first and second combinatorial trial calculation means and the loaded product selecting means in the third aspect of the present invention.

In the present embodiment, the loaded product selecting process in STEP13 shown in FIG. 4 is carried out by the processing means 16 of the computer 13 according to a flowchart shown in FIG. 16.

The processing means 16 selects one pair of lamination combinatorial data (hereinafter referred to as a pair of hypothetical unloading lamination combinatorial data) from the lamination combinatorial data generated by the combinatorial trial calculations in STEP12 shown in FIG. 4 (combinatorial trial calculations based on the adequate combinatorial condition (Pm0, Qn0) in STEP13-31. The selecting process is carried out in exactly the same manner as with the processing in STEP13-12 according to the second embodiment. In the present embodiment, the adequate combinatorial condition (Pm0, Qn0) corresponds to the first combinatorial condition in the first aspect of the present invention. Then, the processing means 16 performs a process, which is exactly the same as the processing in STEP5 through STEP9 (see FIG. 3) described with respect to the first embodiment, on the remaining component data except those component data included in the pair of lamination combinatorial data selected in STEP13-31, held by the component data managing means 15 (the component data relative to all the ring components 4 presently stored in the component storage facility 10), thus carrying out combinatorial trial calculations while variably setting a combinatorial condition (Pm, Qn) in STEP13-32. More specifically, The processing in STEP13-32 differs from the processing in STEP5 through STEP9 only in that the combinatorial trial calculations (the process corresponding to STEP7) serving as a main process in STEP13-32 are effected on the remaining component data except the component data of the selected pair of hypothetical unloading lamination combinatorial data (the combinatorial trial calculations in STEP7 are applied all the component data held by the component data managing means 15).

Then, the processing means 16 compares generated lamination combinatorial numbers (hereinafter referred to as generated lamination combinatorial numbers M' (Pm, Qn)) which are generated under respective combinatorial conditions (Pm, Qn) by the processing in STEP13-32 with each other in STEP13-33. Of the generated lamination combinatorial numbers M' (Pm, Qn) under the respective combinatorial conditions (Pm, Qn), a generated lamination combinatorial number M' (Pm, Qn) which is of a maximum value is stored as a maximum generated lamination combinatorial number M' (Pm1, Qn1), and a combinatorial condition (Pm1, Qn1) corresponding to the maximum generated lamination combinatorial number M' (Pm1, Qn1) are stored in STEP13-34. At this time, the maximum generated lamination combinatorial number M' (Pm1, Qn1) and the combinatorial condition (Pm1, Qn1) are stored in association with the selected pair of hypothetical unloading lamination combinatorial data.

The processing means 16 then determines whether all pairs of lamination combinatorial data of the lamination combinatorial data generated in STEP12 (see FIG. 4) have been selected or not in STEP13-35. If there are any unselected pairs of lamination combinatorial data, then the processing means 16 selects a new pair of lamination combinatorial data in STEP13-31, and then repeats the processing in STEP13-32 through STEP13-34.

Therefore, each time a pair of hypothetical unloading lamination combinatorial data is selected in STEP13-31, the maximum generated lamination combinatorial number M' (Pm1, Qn1) and the combinatorial condition (Pm1, Qn1) corresponding thereto (which corresponds to the second combinatorial condition in the second aspect of the present invention) are observed with respect to the remaining component data except those component data of each layer included in the pair of hypothetical unloading lamination combinatorial data. That is, if a pair of set ring components (4) corresponding to the pair of hypothetical unloading lamination combinatorial data which is selected in STEP13-31 is hypothetically unloaded from the component storage facility 10, it is confirmed how many pairs of set ring components (4) at maximum are obtained by the algorithm of combinatorial trial calculations according to the present embodiment.

If it is confirmed in STEP13-35 that all pairs of lamination combinatorial data are selected in STEP13-31, then the processing means 16 compares maximum generated lamination combinatorial numbers M' (Pm1, Qn1) which are generated so as to correspond to the pairs of hypothetical unloading lamination combinatorial data by the processing in STEP13-31 through STEP13-35 with each other in STEP13-36. One pair of hypothetical unloading lamination combinatorial data which maximize the value of the maximum generated lamination combinatorial number M' (Pm1, Qn1) is stored as a pair of lamination combinatorial data excluded from unloading.

Then, the processing means 16 performs combinatorial trial calculations, in the same manner as with the processing in STEP7, on the remaining component data obtained by removing the component data included in the pair of lamination combinatorial data excluded from unloading from the component data held by the component data managing means 15, in STEP13-37. The combinatorial condition for performing the combinatorial trial calculations is the combinatorial condition (Pm1, Qn1) held in STEP13-34 in association with the pair of lamination combinatorial data excluded from unloading.

The processing means 16 selects as many pairs of lamination combinatorial data as the number of products required to be unloaded from the lamination combinatorial data generated by the combinatorial trial calculations in STEP13-34 according to the unloaded product selecting requirement read in STEP1 in STEP13-38. Then, control returns to the routine shown in FIG. 4.

The unloaded product selecting requirement used in STEP13-38 is a requirement prescribing a priority rank for selecting lamination combinatorial data. In the present embodiment, items for prescribing the unloaded product selecting requirement include a variation of the inter-ring clearance $\Delta r$ between adjacent layers in each lamination combinatorial data (e.g., a standard deviation of $\Delta r$), a total clearance $\Sigma \Delta r$ of each lamination combinatorial data, production dates of the ring components 4 of first through Nth layers corresponding to respective lamination combinatorial data, and lot numbers of the ring components 4.

The unloaded product selecting requirement read in STEP1 is determined in advance such that lamination combinatorial data with a smaller variation of the inter-ring clearance $\Delta r$ is preferentially selected, or lamination combinatorial data with the total clearance $\Sigma \Delta r$ closer to a predetermined value is preferentially selected, or lamination combinatorial data including component data whose production date data correspond to an oldest ring component 4 is preferentially selected, or lamination combinatorial data including component data whose lot number data agrees with a predetermined value is preferentially selected, for example.

In STEP13-39, as many pairs of lamination combinatorial data as the number of products required to be unloaded are selected according to the unloaded product selecting requirement thus determined. For example, if the unloaded product selecting requirement is determined such that lamination combinatorial data with a smaller variation of the inter-ring clearance $\Delta r$ is preferentially selected, then as many sets of both the two lamination combinatorial data included in pairs of lamination combinatorial data generated in STEP13-38 as the number of products required to be unloaded are selected in a sequence from smaller variations of inter-ring clearances $\Delta r$ between the layers from the pairs of lamination combinatorial data generated in STEP13-38.

Other processing details than described above are identical to those of the first embodiment.

In the present embodiment, since as many pairs of lamination combinatorial data as the number of products required to be unloaded are selected from the lamination combinatorial data generated by combinatorial trial calculations on the remaining component data except the lamination combinatorial data excluded from unloading which have been determined as described above, as corresponding to pairs of set ring components (4) to be unloaded from the component storage facility 10 for actually assembling laminated rings, ring components 4 of layers which tend to generate lamination combinatorial data are left in the component storage facility 10. Stated otherwise, as many ring components 4 which are less liable to generate lamination combinatorial data as possible are unloaded from the component storage facility 10. As a result, the component storage facility 10 stores ring components 4 of layers while continuously maintaining a frequency distribution of circumferential length values capable of generating more lamination combinatorial data.

According to the present invention, therefore, as with the first and second embodiments, laminated rings 3 can stably and continuously be mass-produced.

Lamination combinatorial data for selecting a pair of hypothetical unloading lamination combinatorial data are lamination combinatorial data generated by the combinatorial trial calculations under the combinatorial condition (Pm0, Qn0) for maximizing the number of lamination combinatorial data. The lamination combinatorial data excluded from unloading is determined from the above lamination combinatorial data. The combinatorial condition (Pm1, Qn1) in the combinatorial trial calculations (the process in STEP13-37) effected on the remaining data except the lamination combinatorial data excluded from unloading is a combinatorial condition capable of generating maximum lamination combinatorial data with the remaining component data.

Consequently, the number of lamination combinatorial data generated in STEP13-37 can be increased. As a result, as many laminated rings 3 as possible can be assembled of ring components 4 stored in the component storage facility 10, and the mass-productivity of laminated rings 3 can be increased.

In the second through fourth embodiments, a pair of lamination combinatorial data is selected when lamination combinatorial data are hypothetically unloaded (STEP13-12, STEP13-22, STEP13-31). However, a plurality of pairs of lamination combinatorial data may be selected. In such a case, if the number of lamination combinatorial data generated by combinatorial trial calculations in STEP12 is represented by m and the number of pairs of hypothetical unloading lamination combinatorial data selected once is represented by n, then pairs of lamination combinatorial data can be selected in mCn combinations. However, it is not necessary to select pairs of lamination combinatorial data in all the combinations, but pairs of lamination combinatorial data may be selected in a less number of combinations.

INDUSTRIAL APPLICABILITY

As described above, the present invention is useful as an apparatus of assembling a laminated ring for use in a belt for a CVT (continuously variable transmission) on a production line or the like of the belt.

What is claimed is:

1. An apparatus for assembling a laminated ring, comprising:

a component storage facility for storing a plurality of endless ring components of each of layers which are to be laminated into a laminated ring;

component data managing means for storing component data including size data representative of at least respective circumferential length values of the ring components stored in said component storage facility;

combinatorial trial calculation means for performing combinatorial trial calculations to combine the component data of the layers, one by one for all the layers, in said component storage facility under a predetermined combinatorial condition based on the component data of the ring components stored by said component data managing means, to generate a plurality of lamination combinatorial data representing combinations of the ring components of the respectively layers which can be assembled into said laminated ring; and unloaded product selecting means for selecting lamination combinatorial data corresponding to a laminated ring to be actually assembled from the lamination combinatorial data generated by said combinatorial trial calculation means;

wherein ring components of each of the layers corresponding to the lamination combinatorial data selected by said unloaded product selecting means can be unloaded from said component storage facility to assemble a laminated ring;

said unloaded product selecting means comprising:

means for setting a target frequency distribution in a predetermined standard range of size data of ring components of each of the layers such that the target frequency distribution is of a substantially identical shape between the layers and target frequencies in all classes established in said standard range are equal to or greater than a predetermined positive minimum value;

means for determining an actual frequency distribution of size data of ring components of each of the layers in said component storage facility as an actual inventory frequency distribution based on the size data held by said component data managing means;

means for comparing said target frequency distribution and said actual inventory frequency distribution with each other for each of the layers and extracting a layer where an error of said actual inventory frequency distribution with respect to said target frequency distribution is maximum as a particular layer;

means for correcting a deviation, from a target frequency in said target frequency distribution, of a frequency in each of classes in the actual inventory frequency distribution of said particular layer, which frequency is greater than the target frequency in said target frequency distribution, with a predetermined weighting coefficient for each of the classes;

means for selecting a class in which the corrected deviation is of a maximum value as a class with unloading priority; and means for selecting lamination combinatorial data including component data belonging to said class with unloading priority of said particular layer, out of the lamination combinatorial data generated by said combinatorial trial calculation means, as lamination combinatorial data corresponding to a laminated ring to be actually assembled;

wherein said weighting coefficient is established such that the value of said deviation which is corrected by said weighting coefficient is greater for a class whose frequency tends to increase as a new ring component is loaded into said component storage facility.

2. An apparatus according to claim 1, wherein said unloaded product selecting means comprises:

means for determining, for each layer, a variation of the size data of the ring components of each layer which have been loaded into said component storage facility in the past; and means for determining a normal frequency distribution, as a basic frequency distribution for each layer, which has a variation substantially identical to an average value of the determined variations of the layers and also has, at its center, a central value of predetermined size data of the layer;

wherein the target frequency distribution for each layer is established with respect to the basic frequency distribution by correcting the frequency of a class which is lower than said minimum value into said minimum value.

3. An apparatus according to claim 1, wherein if there are a plurality of lamination combinatorial data including component data belonging to said class with unloading priority of said particular layer, said unloaded product selecting means calculates the total number of layers, as a target shortage layer number, where the distribution of said actual inventory frequency distribution is equal to or smaller than the target frequency, based on the distribution of said actual inventory frequency distribution and the target frequency of said target frequency distribution in the classes of the size data of the layers other than said particular layer, and preferentially selects lamination combinatorial data where said target shortage layer number is smaller.

4. An apparatus according to claim 3, wherein if there are a plurality of lamination combinatorial data where said target shortage layer number is minimum, said unloaded product selecting means calculates a deviation between the distribution of said actual inventory frequency distribution and the target distribution in a layer where the distribution of said actual inventory frequency distribution is equal to or smaller than the target distribution, based on the distribution of said actual inventory frequency distribution and the target frequency of said target frequency distribution in the classes of the size data of the layers other than said particular layer, calculates the sum of the deviations of all the layers other than said particular layer as a target shortage sum, and preferentially selects lamination combinatorial data where the absolute value of said target shortage sum is smaller.

5. An apparatus according to claim 1, wherein said laminated ring is used as a pair of laminated rings with the component data of ring components of at least one layer satisfying a predetermined requirement, and wherein if there are a plurality of lamination combinatorial data including component data belonging to said class with unloading priority of said particular layer, said unloaded product selecting means preferentially selects a pair of lamination combinatorial data which satisfy said predetermined requirement and both include component data belonging to said class with unloading priority of said particular layer, out of said plurality of lamination combinatorial data.

6. An apparatus according to claim 1, wherein said combinatorial trial calculation means comprises:

means for variably setting a plurality of kinds of combinatorial conditions and performing said combinatorial trial calculations under the set plurality of kinds of combinatorial conditions; and means for evaluating the number of said lamination combinatorial data obtained by said combinatorial trial calculations under said kinds of combinatorial conditions and determining a combinatorial condition which maximizes said number as an adequate combinatorial condition.

7. An apparatus for assembling a laminated ring, comprising:

a component storage facility for storing a plurality of endless ring components of each of layers which are to be laminated into a laminated ring;

component data managing means for storing component data including size data representative of at least respective circumferential length values of the ring components stored in said component storage facility;

combinatorial trial calculation means for performing combinatorial trial calculations to combine the component data of the layers, one by one for all the layers, in said component storage facility under a predetermined combinatorial condition based on the component data of the ring components stored by said component data managing means, to generate a plurality of lamination combinatorial data representing combinations of the ring components of the respectively layers which can be assembled into said laminated ring; and unloaded product selecting means for selecting lamination combinatorial data corresponding to a laminated ring to be actually assembled from the lamination combinatorial data generated by said combinatorial trial calculation means;

wherein ring components of each of the layers corresponding to the lamination combinatorial data selected by said unloaded product selecting means can be unloaded from said component storage facility to assemble a laminated ring;

said unloaded product selecting means comprising:

means for performing, for a plurality of times, a process of selecting a predetermined number of lamination combinatorial data as hypothetical unloading combinatorial data from the lamination combinatorial data generated by said combinatorial trial calculation means; and means for, each time said predetermined number of hypothetical unloading combinatorial data are selected, determining the degree of agreement between a frequency distribution of the size data in each layer of remaining component data which are obtained by removing the component data of each layer included in the selected hypothetical unloading combinatorial data from the component data held by said component data managing means and a predetermined target frequency distribution for each layer;

wherein said predetermined number of hypothetical unloading combinatorial data where said degree of agreement is higher are preferentially selected as lamination combinatorial data corresponding to a laminated ring to be actually assembled.

8. An apparatus according to claim 7, wherein said target frequency distribution comprises a frequency distribution of size data of a plurality of ring components for each layer which have been loaded into said component storage facility in the past.

9. An apparatus according to claim 7, wherein said target frequency distribution comprises a frequency distribution of size data of a plurality of ring components for each layer which are presently stored in said component storage facility.

10. An apparatus according to claim 7, wherein said unloaded product selecting means determines said degree of agreement by comparing one or both of an average value of the size data of each layer of at least said remaining component data and a variation of said size data with one or both of an average value of size data and a variation thereof with respect to said target frequency distribution.

11. An apparatus according to claim 7, wherein said combinatorial trial calculation means comprises:

means for variably setting a plurality of kinds of combinatorial conditions and performing said combinatorial trial calculations under the set plurality of kinds of combinatorial conditions; and means for evaluating the number of said lamination combinatorial data obtained by said combinatorial trial calculations under said kinds of combinatorial conditions and determining a combinatorial condition which maximizes said number as an adequate combinatorial condition.

12. An apparatus for assembling a laminated ring, comprising:

a component storage facility for storing a plurality of endless ring components of each of layers which are to be laminated into a laminated ring;

wherein ring components to assemble said laminated ring are selected from the ring components of each layer which are stored in said component storage facility, unloaded from said component storage facility, and laminated into a laminated ring;

component data managing means for storing component data including size data representative of at least respective circumferential length values of the ring components stored in said component storage facility;

first combinatorial trial calculation means for performing combinatorial trial calculations to combine the component data of the layers, one by one for all the layers, in said component storage facility under a predetermined first combinatorial condition based on the component data of the ring components stored by said component data managing means, to generate a plurality of lamination combinatorial data representing combinations of the ring components of the respectively layers which can be assembled into said laminated ring;

second combinatorial trial calculation means for performing, for a plurality of times, a process of selecting a predetermined number of lamination combinatorial data as hypothetical unloading combinatorial data from the lamination combinatorial data generated by said first combinatorial trial calculation means, and, each time said predetermined number of hypothetical unloading combinatorial data are selected, performing combinatorial trial calculations on remaining component data which are obtained by removing the component data of the ring components of each layer corresponding to the selected predetermined number of lamination combinatorial data, under a second combinatorial condition based on the remaining component data to generate lamination combinatorial data matching said second combinatorial condition; and unloaded product selecting means for evaluating the number of lamination combinatorial data generated by said second combinatorial trial calculation means per selection of said hypothetical unloading combinatorial data, and selecting lamination combinatorial data corresponding to a laminated ring to be actually assembled from the unloading combinatorial data whose number is maximum;

wherein ring components corresponding to the lamination combinatorial data selected by said unloaded product selecting means are unloaded from said component storage facility and assembled into a laminated ring.

13. An apparatus according to claim 12, wherein said first combinatorial trial calculation means comprises:

means for variably setting a plurality of kinds of combinatorial conditions and performing combinatorial trial calculations on the component data held by said component data managing means based on the set kinds of combinatorial conditions; and means for evaluating the number of said lamination combinatorial data obtained by said combinatorial trial calculations under said kinds of combinatorial conditions and determining a combinatorial condition which maximizes said number as said first combinatorial condition.

14. An apparatus according to claim 12, wherein said second combinatorial trial calculation means comprises:

means for variably setting a plurality of kinds of combinatorial conditions and performing combinatorial trial calculations on remaining component data obtained by removing the hypothetically unloaded combinatorial data from the component data held by said component data managing means based on the set kinds of combinatorial conditions per section of said hypothetically unloaded combinatorial data; and means for evaluating the number of said lamination combinatorial data obtained by said combinatorial trial calculations under said kinds of combinatorial conditions and determining a combinatorial condition which maximizes said number as said second combinatorial condition.

15. An apparatus according to claim 13, wherein said second combinatorial trial calculation means comprises:

means for variably setting a plurality of kinds of combinatorial conditions and performing combinatorial trial calculations on remaining component data obtained by removing the hypothetically unloaded combinatorial data from the component data held by said component data managing means based on the set kinds of combinatorial conditions per section of said hypothetically unloaded combinatorial data; and means for evaluating the number of said lamination combinatorial data obtained by said combinatorial trial calculations under said kinds of combinatorial conditions and determining a combinatorial condition which maximizes said number as said second combinatorial condition.

* * * * *